United States Patent
Fleckenstein et al.

(10) Patent No.: US 10,927,625 B2
(45) Date of Patent: Feb. 23, 2021

(54) DOWNHOLE TRACTOR FOR USE IN A WELLBORE

(71) Applicants: William W. Fleckenstein, Lakewood, CO (US); Christopher Nordin Campbell, Boulder, CO (US); Sean H. Bell, Windsor, CO (US); Trevor Carson Antrim, San Antonio, TX (US); Christian R. Peterson, Golden, CO (US); Trevor Justin Thompson, Stratton, CO (US); Frederico Miguel Rosendo, Golden, CO (US); Tyler Mattson, Westminster, CO (US)

(72) Inventors: William W. Fleckenstein, Lakewood, CO (US); Christopher Nordin Campbell, Boulder, CO (US); Sean H. Bell, Windsor, CO (US); Trevor Carson Antrim, San Antonio, TX (US); Christian R. Peterson, Golden, CO (US); Trevor Justin Thompson, Stratton, CO (US); Frederico Miguel Rosendo, Golden, CO (US); Tyler Mattson, Westminster, CO (US)

(73) Assignee: COLORADO SCHOOL OF MINES, Golden, CO (US)

( * ) Notice: Subject to any disclaimer, the term of this patent is extended or adjusted under 35 U.S.C. 154(b) by 0 days.

(21) Appl. No.: 16/409,402

(22) Filed: May 10, 2019

(65) Prior Publication Data

US 2019/0345785 A1    Nov. 14, 2019

Related U.S. Application Data

(60) Provisional application No. 62/669,644, filed on May 10, 2018.

(51) Int. Cl.
*E21B 23/00* (2006.01)
*E21B 23/14* (2006.01)
(Continued)

(52) U.S. Cl.
CPC .......... *E21B 23/001* (2020.05); *E21B 4/006* (2013.01); *E21B 23/14* (2013.01); *B60B 19/003* (2013.01);
(Continued)

(58) Field of Classification Search
CPC ......... E21B 23/001; E21B 23/14; E21B 4/006
See application file for complete search history.

(56) References Cited

U.S. PATENT DOCUMENTS

| | | |
|---|---|---|
| 1,177,984 A | 4/1916 | Beene |
| 2,085,115 A | 6/1937 | Moineau |

(Continued)

FOREIGN PATENT DOCUMENTS

| | | |
|---|---|---|
| CA | 2775524 | 10/2013 |
| EP | 0564500 | 10/1993 |

(Continued)

OTHER PUBLICATIONS

"GTI Hydraulic Downhole Tractor," Global Technology & Innovation Limited, 2018, retrieved from http://www.gtitools.co.uk/gti-hydraulic-downhole-tractor/, 3 pages.
(Continued)

*Primary Examiner* — Kristyn A Hall
(74) *Attorney, Agent, or Firm* — Sheridan Ross P.C.

(57) ABSTRACT

Embodiments of the present disclosure are generally related to a method and apparatus for performing operations in subterranean wellbores. More specifically, the present disclosure provides a novel downhole tractor for use in a wellbore. The tractor includes a body and a plurality of wheels. The wheels are configured to convert rotation of the
(Continued)

body into linear motion along the wellbore. In one embodiment, the tractor is hydraulically driven. Additionally, or alternatively, the tractor may be electrically driven. Optionally, rotation of a string of pipe interconnected to the tractor drives the tractor.

22 Claims, 18 Drawing Sheets

(51) Int. Cl.
*E21B 4/00* (2006.01)
*E21B 4/18* (2006.01)
*E21B 47/12* (2012.01)
*E21B 17/02* (2006.01)
*E21B 4/04* (2006.01)
*B60B 33/00* (2006.01)
*B60B 19/00* (2006.01)

(52) U.S. Cl.
CPC ............ *B60B 33/0044* (2013.01); *E21B 4/04* (2013.01); *E21B 4/18* (2013.01); *E21B 17/023* (2013.01); *E21B 47/12* (2013.01)

(56) References Cited

U.S. PATENT DOCUMENTS

| | | |
|---|---|---|
| 2,742,259 A | 4/1956 | Boucher |
| 2,871,946 A | 2/1959 | Bigelow |
| 3,405,772 A | 10/1968 | Wisenbaker et al. |
| 3,670,566 A | 6/1972 | Basham et al. |
| 3,753,628 A | 8/1973 | Becker |
| 3,827,512 A | 8/1974 | Edmond |
| 3,862,359 A | 1/1975 | McCullough et al. |
| 3,876,255 A | 4/1975 | Ilon |
| 3,890,905 A | 6/1975 | Clavin |
| 3,926,267 A | 12/1975 | Svirschevsky et al. |
| 3,932,072 A | 1/1976 | Clark |
| 4,031,750 A | 6/1977 | Youmans et al. |
| 4,033,640 A | 7/1977 | Garcia |
| 4,050,384 A | 9/1977 | Chapman |
| 4,071,086 A | 1/1978 | Bennett |
| 4,095,655 A | 6/1978 | Still |
| 4,112,850 A | 9/1978 | Sigel-Gfeller |
| 4,141,414 A | 2/1979 | Johansson |
| 4,177,734 A | 12/1979 | Rhoden |
| 4,190,300 A | 2/1980 | Scalzi |
| 4,192,380 A | 3/1980 | Smith |
| 4,272,781 A | 6/1981 | Taguchi et al. |
| 4,292,988 A | 10/1981 | Montgomery |
| 4,369,713 A | 1/1983 | Richardson |
| 4,372,161 A | 2/1983 | de Buda et al. |
| 4,460,920 A | 7/1984 | Weber et al. |
| 4,463,814 A | 8/1984 | Horstmeyer et al. |
| 4,537,136 A | 8/1985 | Douglas |
| 4,614,232 A | 9/1986 | Jurgens et al. |
| 4,670,862 A | 6/1987 | Staron et al. |
| 4,676,310 A | 6/1987 | Scherbatskoy et al. |
| 4,686,653 A | 8/1987 | Staron et al. |
| 4,718,824 A | 1/1988 | Cholet et al. |
| 4,729,432 A | 3/1988 | Helms |
| 4,797,075 A | 1/1989 | Edwards et al. |
| 4,823,882 A | 4/1989 | Stokley et al. |
| 4,838,170 A | 6/1989 | Illakowicz |
| 4,862,808 A | 9/1989 | Hedgcoxe et al. |
| 4,893,678 A | 1/1990 | Stokley et al. |
| 4,919,223 A | 4/1990 | Egger et al. |
| 5,135,059 A | 8/1992 | Turner et al. |
| 5,142,989 A | 9/1992 | Suzumori et al. |
| 5,184,676 A | 2/1993 | Graham et al. |
| 5,244,044 A | 9/1993 | Henderson |
| 5,293,823 A | 3/1994 | Box |
| 5,309,844 A | 5/1994 | Zollinger |
| 5,375,530 A | 12/1994 | Zollinger et al. |
| 5,375,668 A | 12/1994 | Hallundbaek |
| 5,391,059 A | 2/1995 | Hallundbaek |
| 5,392,862 A | 2/1995 | Swearingen |
| 5,649,603 A | 7/1997 | Simpson |
| 5,794,703 A | 8/1998 | Newman et al. |
| 5,954,131 A | 9/1999 | Sallwasser |
| 6,003,606 A | 12/1999 | Moore et al. |
| 6,019,583 A | 2/2000 | Wood |
| 6,089,323 A | 7/2000 | Newman et al. |
| 6,112,809 A | 9/2000 | Angle |
| 6,179,055 B1 | 1/2001 | Sallwasser et al. |
| 6,241,031 B1 | 6/2001 | Beaufort et al. |
| 6,273,189 B1 | 8/2001 | Gisler et al. |
| 6,345,669 B1 | 2/2002 | Buyers et al. |
| 6,431,270 B1 | 8/2002 | Angle |
| 6,460,616 B1 | 10/2002 | Simpson |
| 6,629,571 B1 | 10/2003 | Downie |
| 6,761,233 B1 | 7/2004 | Aadland |
| 7,159,668 B2 | 1/2007 | Herrera |
| 7,373,974 B2 | 5/2008 | Connell et al. |
| 7,849,927 B2 | 12/2010 | Herrera |
| 8,167,059 B2 | 5/2012 | Oldham et al. |
| 8,177,001 B2 | 5/2012 | McClain et al. |
| 8,770,303 B2 | 7/2014 | Aguirre et al. |
| 8,807,245 B2 | 8/2014 | Scott et al. |
| 8,991,505 B2 | 3/2015 | Fleckenstein et al. |
| 9,045,942 B2 | 6/2015 | Gillis |
| 9,133,673 B2 | 9/2015 | Hill et al. |
| 9,500,058 B2 | 11/2016 | Tunc et al. |
| 9,562,419 B2 | 2/2017 | Fleckenstein et al. |
| 9,759,062 B2 | 9/2017 | Deffenbaugh et al. |
| 10,119,333 B2 | 11/2018 | Bullin |
| 2003/0024710 A1 | 2/2003 | Post et al. |
| 2003/0070841 A1 | 4/2003 | Merecka et al. |
| 2008/0073077 A1 | 3/2008 | Tunc et al. |
| 2009/0236101 A1 | 9/2009 | Nelson et al. |
| 2012/0168176 A1 | 7/2012 | Aguirre et al. |
| 2013/0081807 A1 | 4/2013 | Dyer et al. |
| 2013/0319769 A1 | 12/2013 | Scott |
| 2016/0177637 A1 | 6/2016 | Fleckenstein et al. |
| 2018/0080905 A1* | 3/2018 | Al Nahwi ............... E21B 41/04 |

FOREIGN PATENT DOCUMENTS

| | | |
|---|---|---|
| GB | 2520752 | 6/2015 |
| WO | WO 92/10677 | 6/1992 |
| WO | WO 95/21987 | 8/1995 |
| WO | WO 98/06927 | 2/1998 |
| WO | WO 00/57100 | 9/2000 |
| WO | WO 00/73619 | 12/2000 |
| WO | WO 01/18351 | 3/2001 |
| WO | WO 03/78887 | 9/2003 |
| WO | WO 2013/156781 | 10/2013 |
| WO | WO 2014/100262 | 6/2014 |
| WO | WO 2017/029606 | 2/2017 |
| WO | WO 2017/029613 | 2/2017 |
| WO | WO 2017/029614 | 2/2017 |
| WO | WO 2017/029621 | 2/2017 |
| WO | WO 2017/029622 | 2/2017 |

OTHER PUBLICATIONS

"Production Services Tractor System," Schlumberger, Dec. 2003, 8 pages.
Billingham et al., "Conveyance—Down and Out in the Oil Field," Oilfield Review, vol. 23, No. 2, Summer 2011, pp. 18-31.
Fleckenstein et al., "Novel Wireline Coring System," SPE Annual Technical Conference and Exhibition, Oct. 5-8, 2003, 7 pages.
Henry, "Newsbase: Deep and Meaningful," InnovOil, vol. 10, May 2013, pp. 4-5.
Sheiretov, "Wireline Tractors and Mechanical Services Tools: Comparative Study of Technical Solutions," SPE/ICoTA Coiled Tubing and Well Intervention Conference and Exhibition, Mar. 22-23, 2016, abstract only.

* cited by examiner

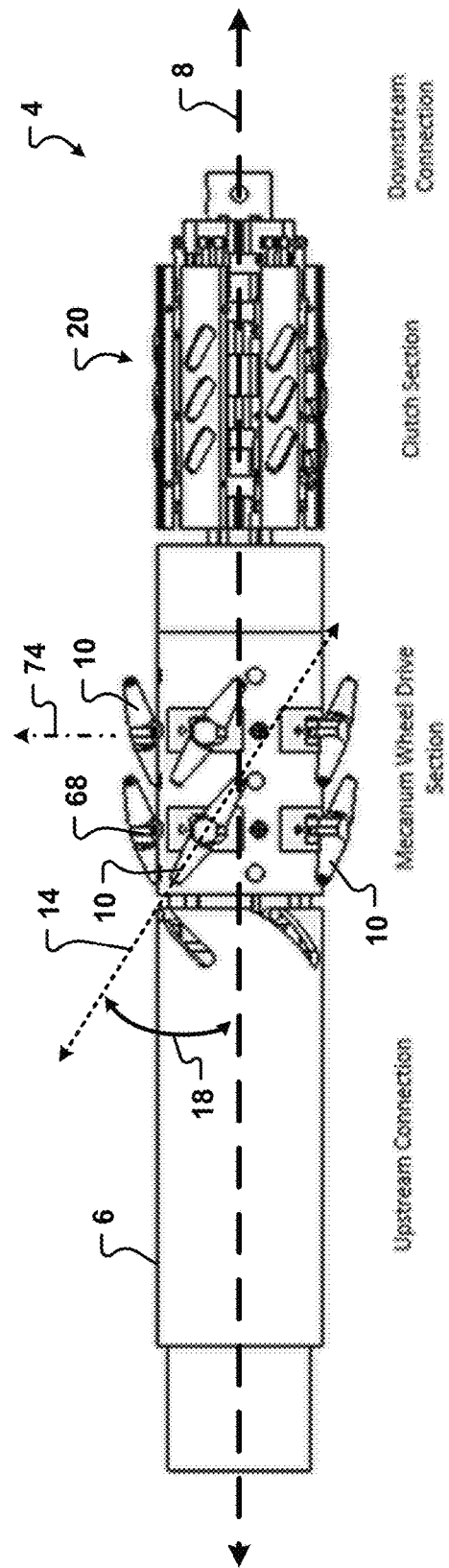
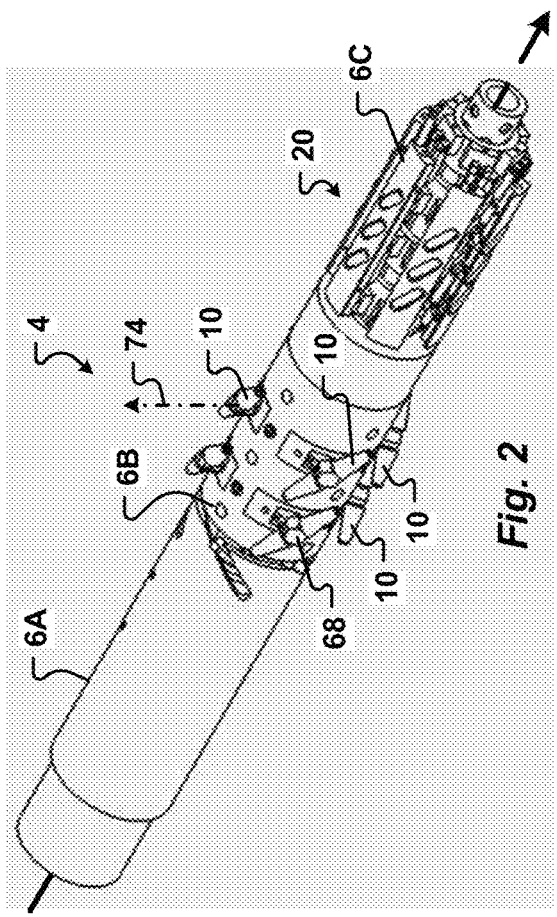
Fig. 1
Fig. 2

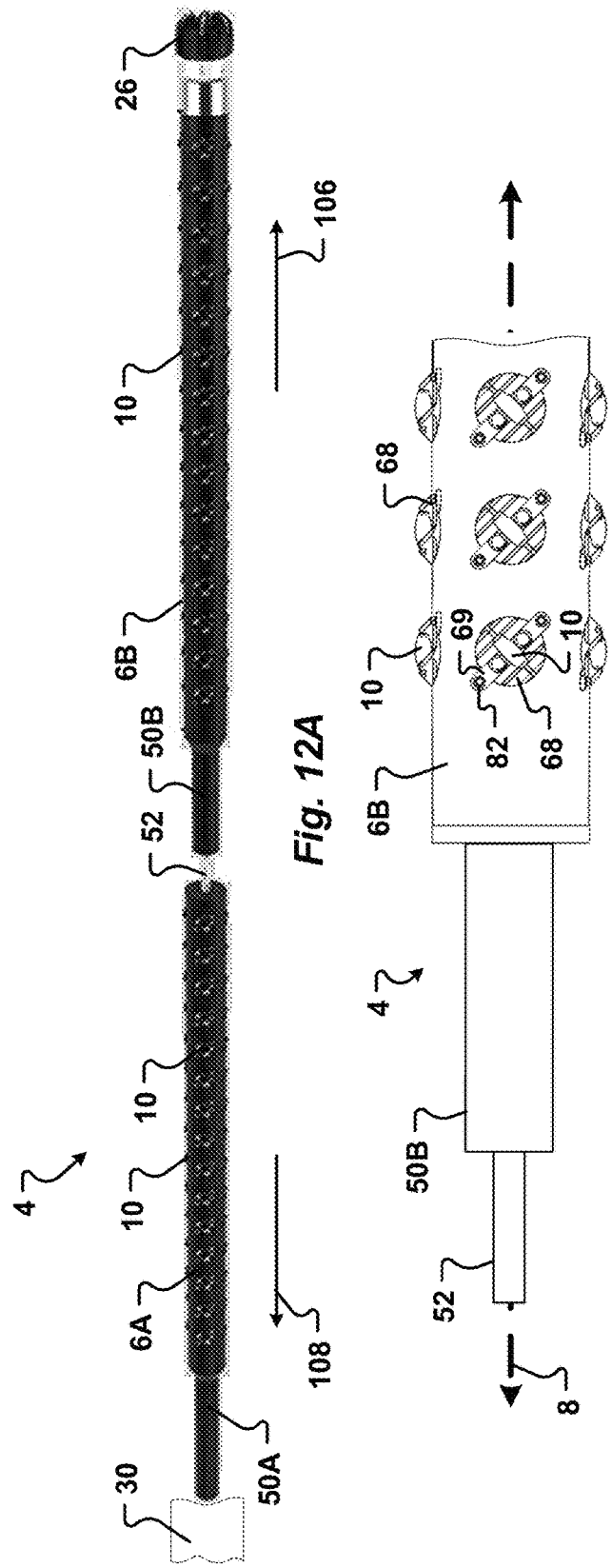
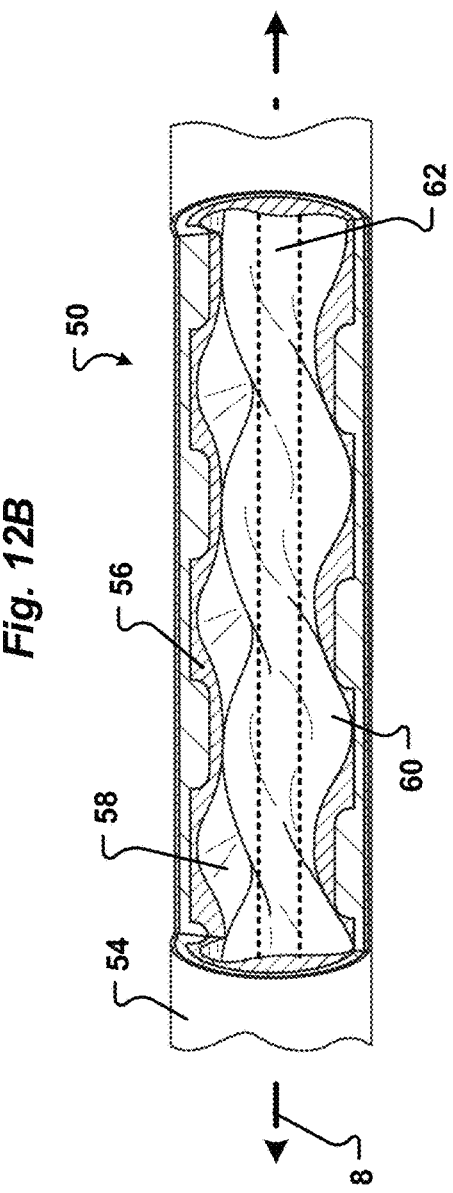
Fig. 12A
Fig. 12B
Fig. 12C

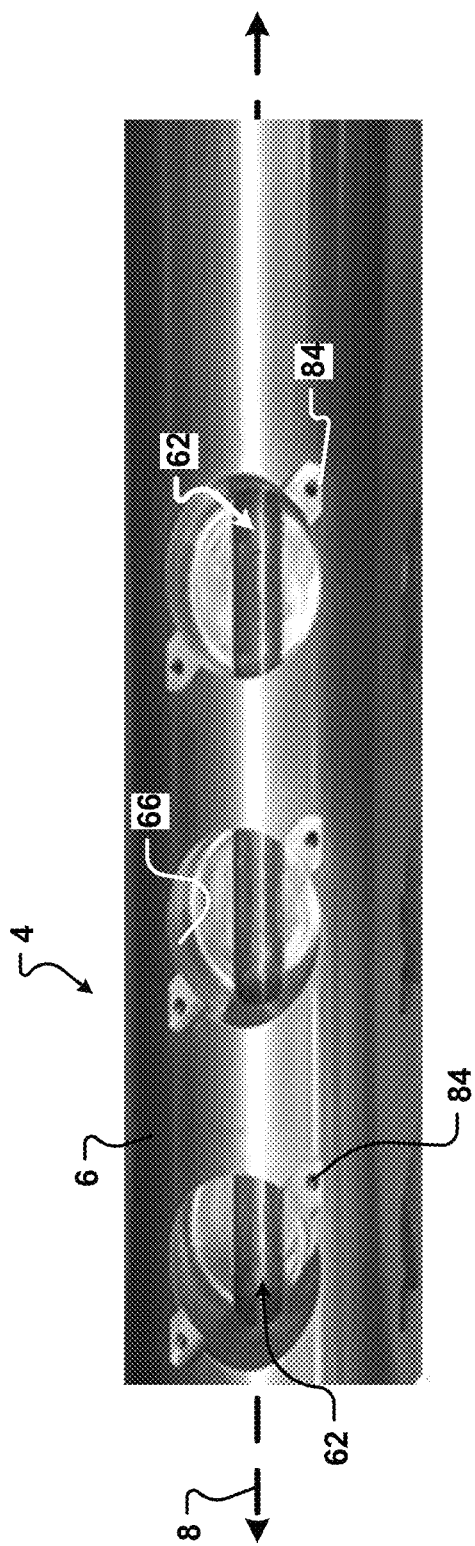
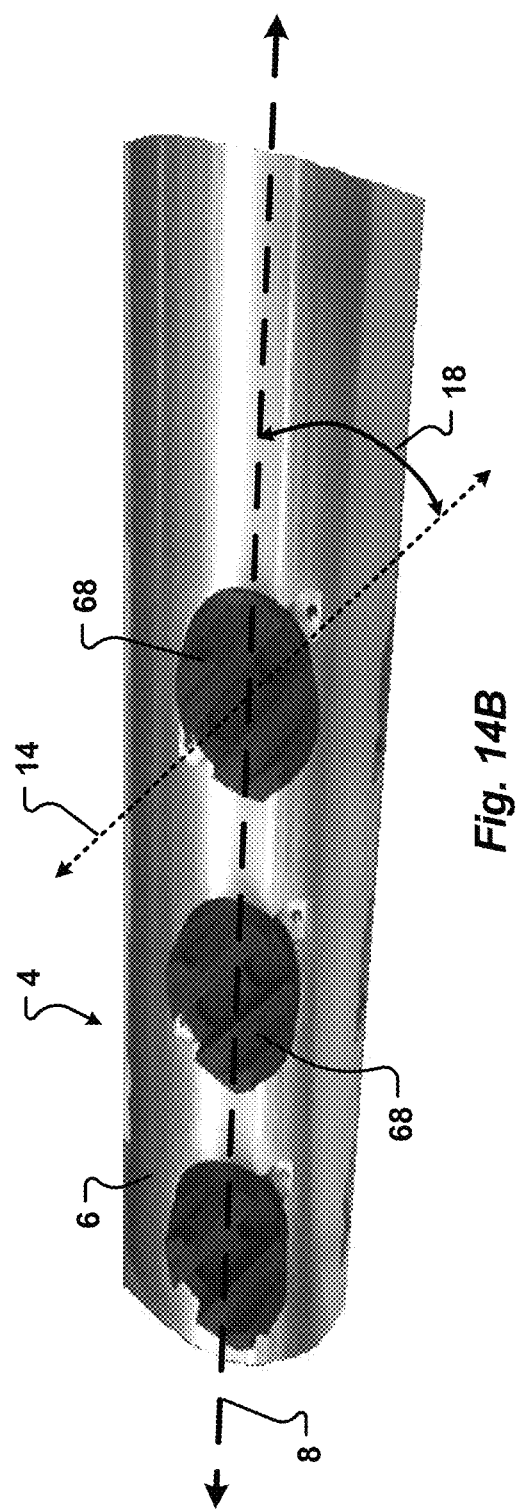
Fig. 14A
Fig. 14B

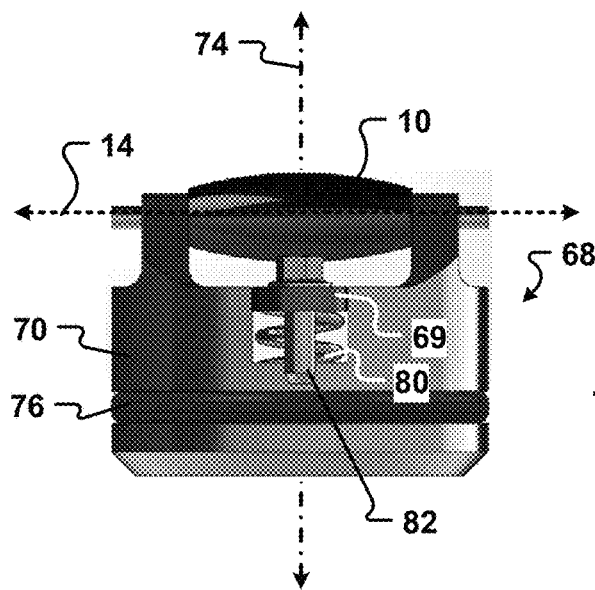
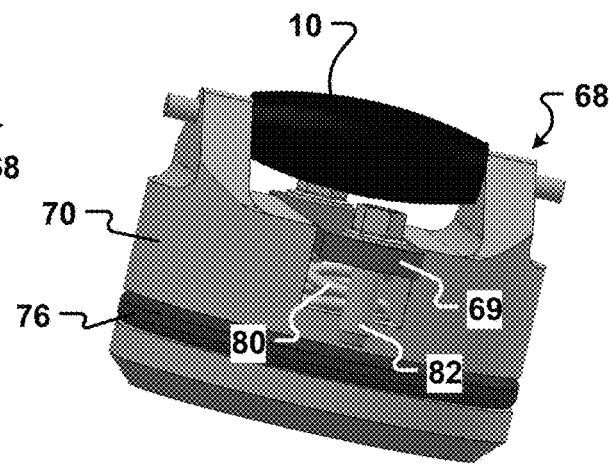
*Fig. 14C*  *Fig. 14D*
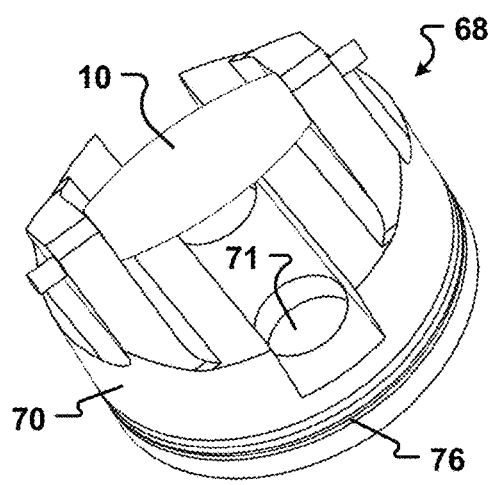
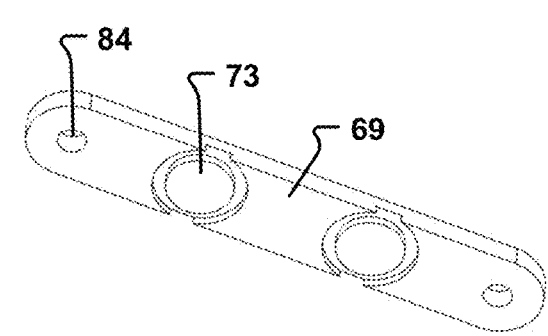
*Fig. 14E*  *Fig. 14F*

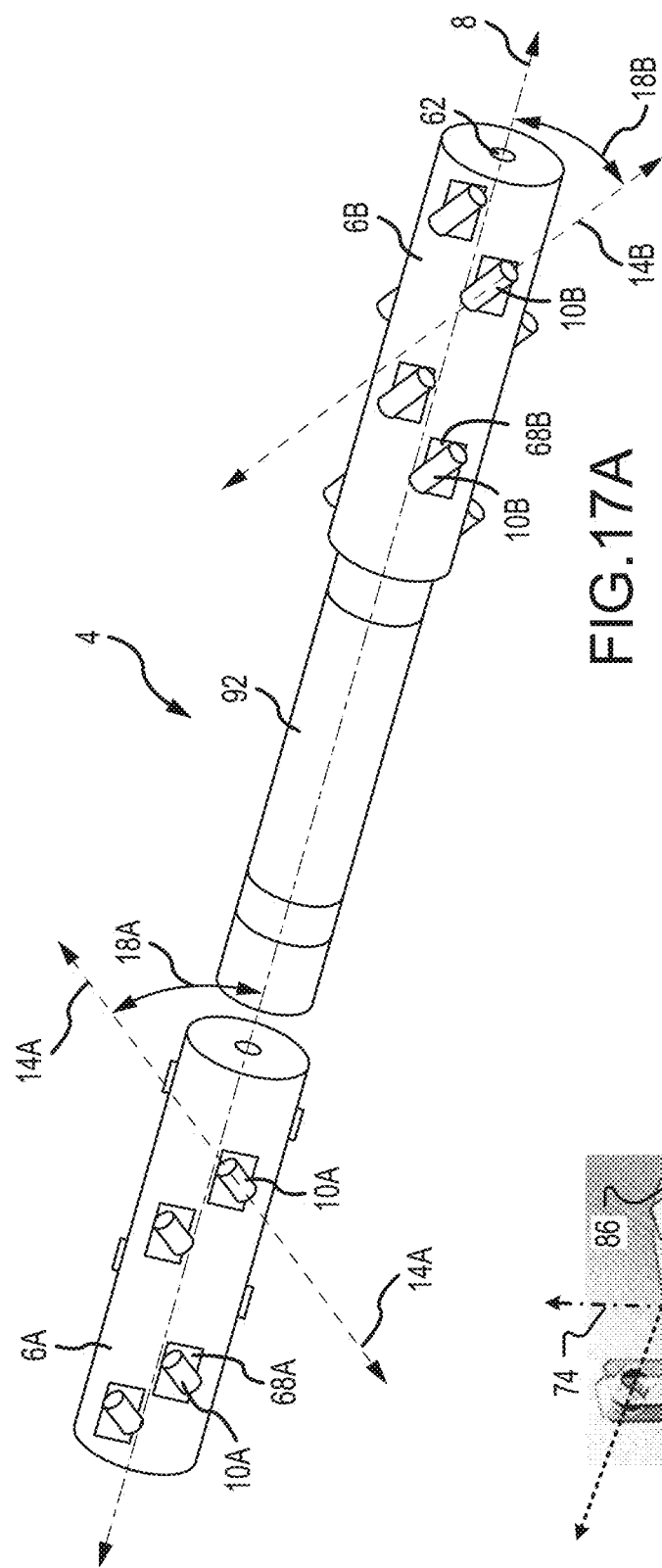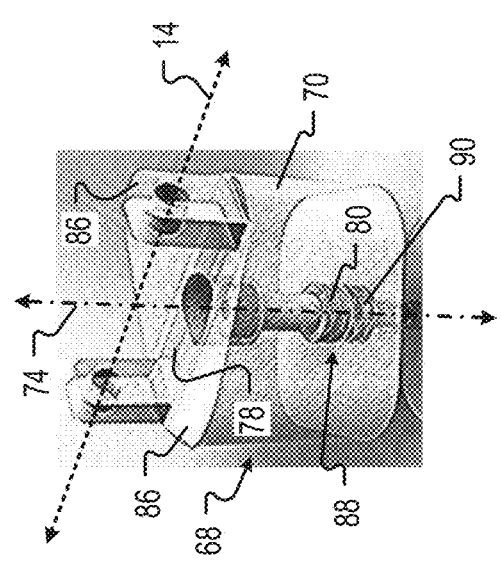

DOWNHOLE TRACTOR FOR USE IN A WELLBORE

CROSS-REFERENCE TO RELATED APPLICATIONS

This application claims priority under 35 U.S.C. § 119(e) to U.S. Provisional Patent Application Ser. No. 62/669,644, entitled "Downhole Tractor For Use In A Wellbore," which was filed May 10, 2018 and is incorporated herein in its entirety by reference.

FIELD

The present disclosure is generally related to downhole devices for performing work in a wellbore. More specifically, the present disclosure relates to novel tractors operable to move along a wellbore to advance equipment, such as coiled tubing, sections of casing, and tools, in the wellbore or to perform operations with tools.

BACKGROUND

The U.S. oil industry has migrated from simpler, vertical wells targeting conventional oil and gas reservoirs to directional wells with primarily horizontal segments which use multistage fracturing technologies targeting unconventional reservoirs. Currently, gravity is the force which provides compression to the drill string to convey drilling and casing strings into the horizontal wells. As the geometries of wells become more complex, with directional and horizontal segments of increasing lengths, delivering tools and pipe to distant portions of the wellbore becomes more challenging. The use of gravity and the weight of the pipe in the vertical section of the wellbore (even when augmented by snubbing forces at the surface to push the pipe into the wellbore) is often not sufficient to convey equipment to reach distant reservoirs along long horizontal wellbore segments. A primary limitation in the length of horizontal segments used in the development of unconventional reservoirs is known as "lock-up" which occurs when gravity is insufficient to overcome friction in the wellbore.

Downhole tractors have been developed to pull tubing and move downhole tools into wells having long horizontal segments. One prior art tractor is a wireline tractor. The wireline tractor has an electric motor to drive wheels which move the tractor forward. Another prior art tractor is known as an "inch-worm" or caterpillar tractor. The caterpillar tractor has a hydraulic piston which uses fluid flowing through the wellbore to drive a segmented body within the wellbore. Alternating segments of the body grip interior surfaces of the wellbore to move the tractor in a reciprocating movement similar to the movement of a caterpillar.

Due to limitations associated with known tractors, there is an unmet need for a downhole tractor for use in a wellbore and which can provide a force to move tools and equipment within a wellbore.

SUMMARY

The present disclosure provides downhole tractors which are more effective than the prior art and without some of the costs and disadvantages of the prior art systems and methods. One aspect of the present disclosure is a tractor including a plurality of wheels extending outwardly from a body of the tractor. The wheels are configured to contact the wellbore and to convert rotational movement of the body into axial (or linear) motion of the tractor along a wellbore. More specifically, as the body rotates, the wheels contact a surface within the wellbore, such as an interior surface of casing, and move on the surface along. The wheels follow a helical path along the wellbore surface. The wheels provide a force to the tractor in a direction substantially parallel to a longitudinal axis of the tractor body. The linear motion of the tractor may be either uphole or downhole within the wellbore. In one embodiment, a tool, such as a drill bit or a milling surface, is interconnected to the tractor.

In one embodiment, the tractor is hydraulically driven. Fluid flowing through the wellbore causes the tractor body to rotate. In one embodiment, fluid flowing through or past the tractor body causes the tractor body to rotate. The wheels extending from the tractor body convert the rotation of the tractor body into linear motion. In this manner, the tractor can operate independent of surface rotation.

In one embodiment, the wheels are arranged in a spiral pattern around the body of the tractor. In another embodiment, the wheels are arrayed in a pattern similar to an Archimedes screw. Accordingly, the wheels can direct cuttings and other material within the wellbore past the tractor body. Additionally, or alternatively, the tractor body may include channels, blades, vanes, and/or other features which interact with the fluid to rotate the tractor body. For example, vanes can extend from an interior surface of the tractor body. The vanes can have a helical or spiral configuration to extract energy from fluid flowing past the tractor.

In another embodiment, a rotary tool, such as a fluid or mud motor, is interconnected to the tractor. The fluid motor is configured to extract energy from the fluid flow and convert the extracted energy into rotational movement or torque. In one embodiment, the fluid motor or mud motor is a hydraulic pump or hydraulic motor. The rotational movement of the fluid motor is transferred to the tractor body. The tractor wheels then convert the rotation of the tractor body into linear motion. The tractor may transfer force and rotation to a tool interconnected to the tractor. The tool can be interconnected to at least one of a distal end and a proximal end of the tractor. Optionally, the fluid motor can transfer energy directly to the tool. For example, the fluid motor can be selectively coupled directly to the tool.

Additionally, or alternatively, the tractor can be interconnected to a string of pipe within the wellbore. Rotation of the string of pipe can be transferred to the tractor body to drive the tractor.

In another embodiment, the tractor is electrically driven. An electric motor is configured to impart rotational movement to the tractor body. The wheels of the tractor then convert the rotation of the tractor body into linear motion. In one embodiment, the electric motor is operable to selectively rotate a shaft. The shaft is interconnected to the tractor body.

One aspect is a downhole tractor that can be fluid actuated with hydraulic pressure. In one embodiment, elements of the downhole tractor can be actuated by fluid flow through a bore through the tractor. More specifically, elements of the tractor and be activated and/or deactivated by altering at least one of the fluid flow and hydraulic pressure. Elements of the downhole tractor can be actuated by increasing the pressure of fluid within the tractor bore and/or the wellbore above a predetermine pressure. In one embodiment, the pressure within the bore of the tractor body can be controlled by a ball or similar object dropped from the surface. The downhole tractor can be configured to engage a ball in the fluid within the wellbore. The downhole tractor can be adapted to alter the flow of fluid through or around the tractor body after engaging a ball.

In one embodiment, the downhole tractor can include a ball seat to engage a ball.

When a ball is seated in the ball seat, the flow of fluid past or through the tractor body will be altered. The ball seat can be configured to open or close a passageway (such as the bore) for fluid when a ball is seated in the ball seat. The fluid can be diverted from a first bore to a second bore by a ball seated in the ball seat. In one embodiment, when a ball is seated in the ball seat, a fluid motor associated with the downhole tractor is activated. Alternatively, the fluid motor is activated when no balls are seated in the ball seat.

When activated, the fluid motor can generate torque which can be selectively transferred to one or more elements of the downhole tractor. In one embodiment, the torque from the fluid motor can rotate the tractor body. Additionally or alternatively, the torque from the fluid motor can drive a tool associated with the downhole tractor, such as a reamer or a drill.

Additionally, or alternatively, the ball seat can be configured to cause an increase in internal pressure within the wellbore. In one embodiment, the ball seat is configured to increase the internal pressure and to move the wheel mounts or a sleeve which is associated with the wheel mounts when a ball is seated therein. Accordingly, in one embodiment, the wheel mounts of the tractor body can move to either an extended or retracted position when a ball is seated in the ball seat. In one embodiment, the wheel mounts move outwardly to an extended position when the ball is seated in the ball seat. Alternatively, the wheel mounts can move inwardly to a retracted position when the ball is seated in the ball seat.

In one embodiment, the fluid or mud motor can be activated by seating a ball in the ball seat. Accordingly, in one embodiment, the fluid motor can be deactivated by removing or unseating a ball from the ball seat.

In one embodiment, a ball can be removed from the ball seat by increasing the pressure of the fluid above a predetermined amount. In this manner, the ball can be flushed past or out of the ball seat. For example, the ball seat can be configured to retain a ball when the fluid is less than a predetermined pressure. The ball seat can also be configured to release the ball when the fluid is greater than the predetermined pressure. In another embodiment, increasing the pressure above the predetermined amount can fracture or crush the ball such that the ball is released from the ball seat. In yet another embodiment, a fluid or particles can be added to the fluid to erode or degrade the ball such that the ball is released from the ball seat. Accordingly, the ball can be configured to degrade, erode, or fracture. In one embodiment the ball comprises a material that is selected to dissolve. Optionally, the ball can be hollow. The hollow ball can be configured to collapse or fracture when the hydraulic pressure exceeds a predetermined amount.

Additionally, or alternatively, the downhole tractor can include a sleeve or a valve. The sleeve or valve can be configured to move in response to contact from a ball transported by fluid in the wellbore. In one embodiment, the sleeve can move to at least two positions. In a first position of the sleeve, fluid pumped into the wellbore can move through a passageway (such as a bore) through the tractor body. In a second position, the sleeve can at least partially or completely block the passageway through the tractor. The sleeve can be biased to one of the first position and the second position. In one embodiment, the sleeve is biased to the first position and can move to the second position in response to contact from a ball. Alternatively, in another embodiment, the sleeve is biased to the second position and can move to the first position in response to contact from the ball.

The downhole tractor can be configured to activate one or more of a fluid motor, a clutch, a locking mechanism, a gearbox, a tool (such as a drill or a reamer), and a rotatable body when the sleeve is in the first position or the second position. Additionally, or alternatively, the downhole tractor can be configured to deactivate one or more of the fluid motor, the clutch, the locking mechanism, the gearbox, the wheel mount, the tool, and the rotatable body when the sleeve is in the second position or the first position.

In one embodiment, wheel mounts associated with the tractor body can move outwardly when the sleeve is in the first position and the fluid pressure within the passageway exceeds a predetermined pressure. In this manner, wheels associated with the wheel mount can engage an interior surface of the wellbore. Additionally, or alternatively, the wheel mounts can retract inwardly such that the wheels will be spaced from the wellbore interior surface when the sleeve is in the second position and the fluid pressure within the passageway is below the predetermined pressure.

The downhole tractor can be configured to take a first action in response to contact from a first ball. The downhole tractor can be configured to take a second action in response to contact from a second ball. Optionally, the second action can be opposite of the first action.

In one embodiment, the sleeve is configured to move to the first position in response to contact from a first ball. Additionally, or alternatively, the sleeve can be configured to move to the second position in response to contact from a second ball. In this manner, an operator can activate or deactivate one or more elements of a downhole tractor by releasing a first ball into fluid flowing through the wellbore. The operator can subsequently deactivate or activate one or more of the elements of the downhole tractor by releasing a second ball into the wellbore.

Additionally, or alternatively, the downhole tractor can be configured to respond to contact from balls of different sizes and/or different shapes in one or more different ways. One or more elements of the downhole tractor can be configured to respond to a first ball of a first diameter or a first shape. For example, the downhole tractor can be configured to engage or retain a first ball of a first diameter. In one embodiment, when a ball of a first diameter contacts, engages, and/or is retained by the downhole tractor, the downhole tractor can activate or deactivate one or more of: a fluid motor, a clutch, a locking mechanism, a gearbox, a wheel mount, a tool (such as a drill or a reamer), and a rotatable body.

The downhole tractor can also be configured to engage or retain a second ball of a second diameter or a second shape. In one embodiment, when a ball of a second diameter contacts, engages, and/or is retained by the downhole tractor, the downhole tractor can deactivate or activate one or more of the fluid motor, the clutch, the locking mechanism, the gearbox, the wheel mount, the tool, and the rotatable body.

Optionally, the first diameter is greater than the second diameter. Alternatively, the first diameter is smaller than the second diameter. In one embodiment, a ball of the first diameter can prevent a ball of the second diameter from contacting, engaging, and/or being retained by the downhole tractor. In another embodiment, a ball of the first diameter can cause the downhole tractor to release a ball of the second diameter.

In another embodiment, the tractor can have two or more ball seats. The tractor can be configured to activate one or more elements when a first ball is seated or retained in a first ball seat. Similarly, the tractor can be configured to deactivate one or more elements when a second ball is seated or retained in a second ball seat. In one embodiment, the first ball seat can be configured to retain first balls of a different size or shape than second balls that the second ball seat is configured to retain. In this manner, a first ball dropped into the wellbore can pass by or through the second ball seat but be retained by the first ball seat. The second ball seat can capture or retain a second ball that the first ball seat cannot retain. Optionally, the second ball seat can be positioned uphole relative to the first ball seat.

In one embodiment, the downhole tractor can be operated without any connection to surface equipment being required, for example, by mud pulse telemetry, wireless acoustic, or electromagnetic pulse. Alternatively, one or more features of the downhole tractor can be actuated or controlled by a control unit at the surface. The control unit can send a first signal to change a position or operation of one or more of a motor (such as a fluid or mud motor or an electric motor), a clutch, a locking mechanism, a gearbox, a wheel mount, a tool, and a rotatable body. The first signal can cause the wheel mount to extend outwardly. A second signal from the control system can alter the position or operation of one or more of the motor, the clutch, the locking mechanism, the gearbox, the wheel mount, the tool, and the rotatable body. For example, the second signal can cause the wheel mount to retract inwardly.

The control unit can communicate with the downhole tractor by a wireline, optical cable, a coiled tubing, or wirelessly using fluid in the borehole, for example, by mud pulse telemetry, wireless acoustic, or electromagnetic pulse. In one embodiment, the downhole tractor can transmit signals and data to the surface in real time or at intervals in discrete packets.

One aspect of the present disclosure is a downhole tractor for use in a wellbore. The downhole tractor generally comprises: (1) a body; and (2) a plurality of wheels in operable contact with the wellbore and configured to convert rotational movement of the body into linear motion within the wellbore. In one embodiment, the tractor is hydraulically driven. Additionally, or alternatively, the tractor can optionally be electrically driven. In another embodiment, the tractor is driven by a rotating string of pipe interconnected to the tractor body.

The wheel can optionally be configured to spin or rotate freely around an axle. In one embodiment, the wheels have a frusto-conical shape. In another embodiment, the wheels are configured to rotate around a wheel axis which is transverse to a longitudinal axis of the body.

Optionally, the wheels are selectively extendable from the body. Specifically, in one embodiment, the wheels can be selectively extended from, or retracted toward, the body. The extension and retraction of the wheels can optionally be controlled by fluid pressure in the wellbore. For example, in one embodiment, the wheels can extend outwardly in response to a predetermined first fluid pressure. When the fluid pressure decreases below the first fluid pressure, the wheels can retract inwardly. In this manner, operation of the tractor, such as forward movement, can be controlled by altering the pressure of fluid within the wellbore.

In one embodiment, an angle of the wheels relative to a longitudinal axis of the body can be altered. More specifically, axes of the wheels can be aligned substantially parallel, transverse, or approximately perpendicular to the longitudinal axis of the body. The angle of the wheel axes relative to the body longitudinal axis can be adjusted to control one or more of the rate of rotation of the tractor, the rate of longitudinal movement of the tractor, and the axial or linear force and/or torque generated by the tractor for pushing, pulling and operating a tool.

In one embodiment, a proximal portion of the body is configured to interconnect to a downhole end of casing or coiled tubing. Optionally, a distal portion of the body is configured to interconnect to a downhole tool. In one embodiment, the downhole tool comprises a drill bit or a milling surface. Additionally, or alternatively, the distal portion of the body can interconnect to a second downhole tractor or an uphole end of a section of casing. In another embodiment, a downhole tool can be interconnected to an uphole end of the downhole tractor.

Another aspect of the present disclosure is a method of performing an operation in a wellbore. The method includes, but is not limited to, one or more of: (1) providing a tractor with a body having a plurality of wheels which can be selectively positioned in operable contact with the wellbore and configured to convert rotation of the body into linear motion of the tractor body; (2) interconnecting a downhole tool to the tractor; and (3) rotating the tractor body such that the tractor and the downhole tool apply a force in the wellbore in a direction substantially parallel with the wellbore. In one embodiment, the downhole tool is a drill bit or a milling surface. Optionally, the downhole tool is used to drill an obstruction. Obstructions that the downhole tool can clear include cavings (or sections of borehole that have collapsed), beds of drill cuttings, and frac plugs positioned in the wellbore. The tractor can provide force to the downhole tool to clear or drill through the obstruction without torque or rotation of a tubular string in the wellbore. In one embodiment, the downhole tool includes a cutting or drilling surface. Optionally, the downhole tool is interconnected at a distal end of the tractor. Additionally, or alternatively, a downhole tool can be interconnected to a proximal end of the tractor.

In one embodiment, rotating the tractor body comprises pumping a fluid through the wellbore. Additionally, or alternatively, rotating the tractor body can include activating an electric motor. In one embodiment, the electric motor is associated with the tractor. Alternatively, the electric motor includes a shaft that is interconnected to the tractor body.

In one embodiment, the method includes positioning a coil tubing unit at the wellbore. The method may also include interconnecting the coiled tubing to the tractor body and rotating the tubing to drive the tractor.

One aspect of the present disclosure is a downhole tractor for use in a wellbore. The tractor includes: (1) a body; and (2) a plurality of wheels extendable outwardly from the body to contact the wellbore, the wheels configured to convert rotational movement of the body into linear motion within the wellbore to provide a force in a direction substantially parallel with the wellbore.

The tractor is hydraulically driven in one embodiment. Additionally, or alternatively, the tractor can be electrically driven. In one embodiment, the tractor body is rotated by a connection to a hydraulic pump or hydraulic motor.

In one embodiment, casing is positioned within the wellbore. The tractor can be interconnected to a separate inner string of pipe or to coiled tubing within the casing. Optionally, the tractor can be driven by rotation of the inner string of pipe.

In one embodiment, each of the plurality of wheels is configured to rotate around a respective rotation axis. The rotation axes of the wheel can be oriented at an angle of between approximately 0° and approximately 180° degrees relative to a longitudinal axis of the tractor body. Optionally, the angle between the rotation axis of a wheel and the longitudinal axis can be adjusted. In one embodiment, the angle is adjusted by pivoting the wheel. In another embodiment, adjusting the angle of the wheel axes alters at least one of a rate of rotation of the tractor body, a rate of linear movement of the tractor, and a magnitude of the force generated by the tractor.

One aspect of the present disclosure is a downhole tractor for use in a wellbore. The tractor is operable to advance or retract a tool or a string of pipe in a wellbore and generally includes, but is not limited to: (1) a body having an upper end, a lower end, and a longitudinal axis extending from the lower end to the upper end; and (2) a plurality of wheels selectively extendable outwardly from the body to contact the wellbore, the wheels configured to convert rotational movement of the body into linear motion within the wellbore to provide a force in a direction substantially parallel with the wellbore to move the tool or the string of pipe in a predetermined direction.

The tractor can be hydraulically driven. In one embodiment, a mud or fluid motor is interconnected to the downhole tractor. The mud motor is operable to extract energy from fluid flowing through the wellbore and concert the energy to torque. The mud motor can selectively transfer the torque to the tractor body to rotate the tractor body in either a first direction or a second direction. In one embodiment, the mud motor is a reverse Moineau motor.

Optionally, one or more elements of the tractor are electrically driven. In one embodiment, the tractor is driven by rotation of the string of pipe.

Each of the plurality of wheels rotate around a respective rotation axis. In one embodiment, the rotation axis of a wheel is oriented at an angle of between approximately 0° and approximately 90° relative to the longitudinal axis of the tractor body. Optionally, the angle between the rotation axis of the wheel and the longitudinal axis can be adjusted. In one embodiment, the angle is adjusted by pivoting the wheel. More specifically, in one embodiment the wheel is interconnected to the tractor body by a wheel mount. The wheel mount includes a mount axis that is oriented transverse to the longitudinal axis of the tractor body. In one embodiment, the wheel mount can pivot or rotate around the mount axis. In one embodiment, rotating the angle of the wheel rotation axis can alter at least one of a rate of rotation of the tractor body and a rate of movement of the tractor. Optionally, the wheels are Mecanum wheels configured to generate a force vector that is transverse to the rotation axes of the wheels.

In one embodiment, the plurality of wheels can be selectively extended or retracted from the body by an increase or a decrease of hydraulic pressure in the wellbore. In another embodiment, a bore extends from the upper end to the lower end of the tractor body such that fluid in the wellbore can flow through the body bore. In this manner, the plurality of wheels can be configured to extend outwardly when hydraulic pressure in the wellbore exceeds a predetermined amount.

In one embodiment, each wheel of the plurality of wheels is positioned on a wheel mount that is movably retained within an aperture in the body. Optionally, the wheel mount is rotatable around a mount axis to alter an angle between the longitudinal axis and a rotation axis of the wheel.

The downhole tractor can further include a ball seat. In one embodiment, the ball seat is configured to alter hydraulic pressure proximate to the tractor body. Optionally, when a ball is seated in the ball seat, the plurality of wheels extend outwardly. In another embodiment, when a ball is seated in the ball seat, the plurality of wheels retract inwardly.

It is another aspect of the present disclosure to provide a method of advancing or retracting a tool or a string of pipe in a wellbore. The method generally comprises: (1) providing a tractor with a body having an upper end, a lower end, and a plurality of wheels positioned therebetween for operable contact with the wellbore and configured to convert rotation of the body into linear motion of the tractor body and to generate a force in a direction substantially parallel to the wellbore at the location of the tractor; (2) interconnecting a downhole tool to the tractor; and (3) rotating the tractor body such that the tractor and the downhole tool apply a force in the wellbore in a direction substantially parallel with the wellbore.

In one embodiment, rotating the tractor body comprises at least one of pumping a fluid through the wellbore to create hydraulic energy, activating an electric motor, and rotating a pipe which is interconnected to the tractor.

The method can optionally include selectively pivoting a wheel of the plurality of wheels to alter an angle between a rotation axis of the wheel and a longitudinal axis of the tractor body. Altering the angle of the wheel rotation axis can adjust at least one of the amount of force generated by the tractor or the direction of the force. Additionally, or alternatively, altering the angle of the wheel rotation axis can adjust at least one of a rate of movement of the tractor and a rate of rotation of the tractor body.

In one embodiment, the plurality of wheels are extended and retracted from the tractor body by an increase or a decrease in hydraulic pressure of fluid in the wellbore. Accordingly, the method can further include increasing hydraulic pressure of fluid in the wellbore to move the plurality of wheels to an extended position in contact with the wellbore.

In one embodiment, the method includes dropping a ball into the wellbore to change a position of the plurality of wheels relative to the tractor body. The ball can engage a ball seat of the tractor.

Another aspect of the present disclosure is a method of performing an operation in a wellbore. The method includes one or more of, but is not limited to: (1) providing a tractor with a body having a plurality of wheels in operable contact with the wellbore and configured to convert rotation of the body into linear motion of the tractor body; (2) interconnecting a downhole tool to the tractor; and (3) rotating the tractor body such that the tractor and the downhole tool apply a force in the wellbore in a direction substantially parallel with the wellbore at the location of the tractor.

In one embodiment, rotating the tractor body comprises at least one of pumping a fluid through the wellbore, activating an electric motor, and rotating a pipe located within the wellbore. In one embodiment, the tractor is interconnected to a hydraulic pump or a hydraulic motor. Accordingly, the tractor body can rotate in response to a torque received from the hydraulic pump or the hydraulic motor. Optionally, the tractor body can be interconnected to a shaft extending from the hydraulic pump or the hydraulic motor. In one embodiment, the tractor can include one or more of a gearbox or other torque transfer device, bearing elements, and a connection by which the tractor body can be coupled to at least one of an electric motor, a pipe, a hydraulic pump, and a hydraulic motor.

The method may optionally include pivoting a wheel of the plurality of wheels to alter an angle between a rotation axis of the wheel and a longitudinal axis of the tractor body.

In one embodiment, altering the angle adjusts at least one of a rate of movement of the tractor and a rate of rotation of the tractor body.

Tractors of all embodiments of the present disclosure can be used to convey tools and equipment within the wellbore, such as logging and perforating tools. The tractors can be configured to either push or pull the tool and equipment in an uphole direction and/or a downhole direction depending upon the orientation and angle of the wheels and direction of rotation of the tractor body. The tractors may also be used to power a drill bit, a reamer, or to advance, withdraw, or move a wireline, coiled tubing, drill pipe, or sections of casing within the wellbore.

The term "wellbore" and variations thereof, as used herein, refers to a hole drilled into the earth's surface to explore or extract natural materials to include water, gas and oil. The wellbore may or may not be lined with casing. Accordingly, tractors of the present disclosure can be used in "open hole" or unlined wellbores. The invention can also be utilized for injection wells.

The term "casing" and variations thereof, as used herein, refers to large diameter pipe that is assembled and inserted into a wellbore and typically secured in place to the surrounding formation with cement. The casing may be made of metal, plastic and other materials known in the art.

The term "casing string" and variations thereof, as used herein, refers to assembled lengths of casing with various tools, like centralizers and floats, and may include liners, which are casing strings that do not originate at the surface of the wellbore.

The term "tubular string" and variations thereof, as used herein, refers to an assembled length of pipe, to include jointed pipe and integral tubular members such as coiled tubing, and which generally is positioned within the casing.

The term "drill pipe" and variations thereof, as used herein, refers to the tubular steel conduit fitted with threaded ends and typically used for drilling.

The term "drill string" and variations thereof, as used herein, refers to the combination of the drill pipe, the bottomhole assembly and any other tools used to make a drill bit turn at the bottom of the wellbore.

The term "fluid" means a substance that continually deforms or flows under an applied shear stress and includes liquids such as water and gases such as air.

Unless otherwise indicated, all numbers expressing quantities, dimensions, conditions, and so forth used in the specification and claims are to be understood as being modified in all instances by the term "about." Accordingly, unless otherwise indicated, all numbers expressing quantities, dimensions, conditions, ratios, ranges, and so forth used in the specification and claims may be increased or decreased by approximately 5% to achieve satisfactory results. In addition, all ranges described herein may be reduced to any sub-range or portion of the range, or to any value within the range without deviating from the invention.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary of the Invention, Brief Description of the Drawings, Detailed Description, Abstract, and Claims themselves.

This Summary is neither intended nor should it be construed as being representative of the full extent and scope of the present disclosure. The present disclosure is set forth in various levels of detail in the Summary as well as in the attached drawings and the Detailed Description of the Invention, and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein. However, the Detailed Description, the drawing figures, and the exemplary claims set forth herein, taken in conjunction with this Summary, define the invention of the present disclosure.

BRIEF DESCRIPTION OF THE DRAWINGS

The accompanying drawings, which are incorporated in and constitute a part of the specification, illustrate embodiments of the present disclosure and together with the general description of the aspects and embodiments given above, and the detailed description of the drawings given below, serve to explain the principals of this disclosure.

FIG. 1 is a side elevation view of a downhole tractor of one embodiment of the present disclosure;

FIG. 2 is a perspective view of the downhole tractor of FIG. 1;

FIG. 12A is a side elevation view of a downhole tractor of another embodiment of the present disclosure;

FIG. 12B is a side elevation view of a portion of the downhole tractor of FIG. 12A illustrating a mud motor interconnected to a body portion of the tractor;

FIG. 12C is a partial cut-away side elevation view illustrating one embodiment of a mud motor that can be interconnected to the downhole tractor;

FIG. 14A is yet another side elevation view of a portion of a downhole tractor according to one embodiment of the present disclosure and showing a body of the tractor with wheel mounts removed to show mount apertures in the body;

FIG. 14B is a partial perspective view of the downhole tractor of FIG. 14A and showing wheel mounts positioned in the mount apertures of the tractor body;

FIG. 14C is a side elevation view of a wheel mount according to another embodiment of the present disclosure;

FIG. 14D is a side perspective view of the wheel mount of FIG. 14C;

FIG. 14E is a top perspective view of the wheel mount of FIG. 14C with a mount bracket removed for clarity;

FIG. 14F is a bottom perspective view of a mount bracket for the wheel mount of FIG. 14C;

FIG. 17A is an expanded view of a portion of the electric tractor of FIG. 16 and illustrating a housing for an electric motor positioned between a first body portion and a second body portion of the electric tractor;

FIG. 17B is a side perspective view of a wheel mount according to yet another embodiment of the present disclosure;

Figure 3:
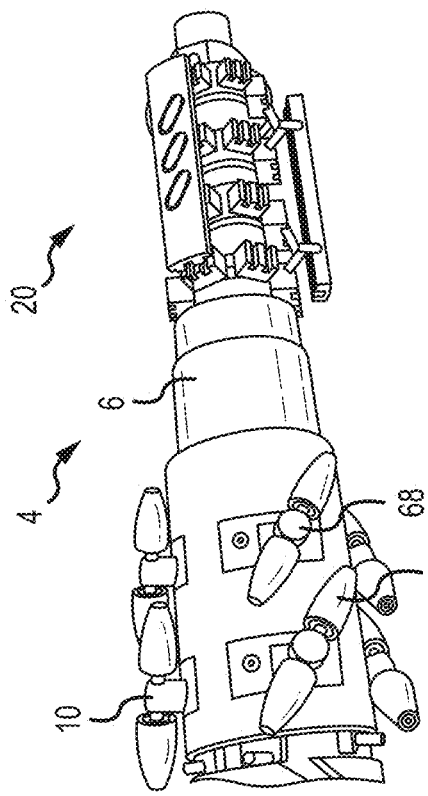
FIG. 3 is another perspective view of the downhole tractor illustrating a clutch mechanism in a disengaged position.

It should be understood that the drawings are not necessarily to scale. In certain instances, details that are not necessary for an understanding of the disclosure or that render other details difficult to perceive may have been omitted. It should be understood, of course, that aspects of the disclosure are not necessarily limited to the particular embodiments illustrated herein.

To assist in the understanding of the present disclosure the following list of components and associated numbering found in the drawings is provided herein:

| Number | Component |
|---|---|
| 4 | Tractor |
| 6 | Body or housing of the tractor |
| 8 | Longitudinal axis |
| 10 | Wheel or roller |
| 12 | Exterior surface of wheel |
| 14 | Wheel axis |
| 16 | Force vector of a wheel |
| 18 | Wheel angle |
| 20 | Clutch system |
| 22 | Cam system |
| 24 | Tractor system |
| 26 | Tool interconnected to the tractor |
| 28 | Wellbore |
| 30 | Casing |
| 32 | Frac plug |
| 36 | Coiled tubing unit |
| 38 | Control unit |
| 40 | Wireline |
| 42 | Wireline unit |
| 44 | Coiled tubing |
| 50 | Mud or fluid motor |
| 52 | Shaft |
| 54 | Rotatable motor body |
| 56 | Outer stator |
| 58 | Internal cavity |
| 60 | Rotor (non-rotating) |
| 62 | Bore through the tractor body |
| 64 | Fluid passageway to a wheel mount aperture |
| 66 | Body aperture for a wheel mount |
| 68 | Wheel mount |
| 69 | Mount bracket |
| 70 | Mount body |
| 71 | Spring mount |
| 72 | Mount shaft |
| 73 | Spring retainer |
| 74 | Mount axis |
| 76 | Seal |
| 78 | Wheel recess |
| 80 | Biasing element or spring |
| 82 | Fastener |
| 84 | Fastener Bore |
| 86 | Lip |
| 88 | Suspension system |

-continued

| Number | Component |
|---|---|
| 90 | Flexible spacers of suspension system |
| 92 | Electric motor housing |
| 94 | Electric motor |
| 96 | Batteries |
| 98 | Gearbox |
| 100 | Locking mechanism |
| 102 | Lead screw |
| 104 | Pump |
| 106 | Downhole direction |
| 108 | Uphole direction |
| 110 | Ball seat |
| 110A | Upper ball seat |
| 110B | Lower ball seat |
| 112 | Ball |
| 114 | Fluid flow |
| 116 | Sleeve |
| 118 | Perforation |
| 120 | Aperture |

DETAILED DESCRIPTION

Referring now to FIGS. 1-17, downhole tractors 4 of embodiments of the present disclosure are generally illustrated. The tractors 4 generally include a body 6 extending along a longitudinal axis 8. In one embodiment, the body has a generally cylindrical shape although other shapes are contemplated. The body 6 may include a proximal portion 6A, a medial portion 6B, and a distal portion 6C.

A plurality of rollers or wheels 10 are interconnected to the body 6. The wheels 10 can be extended outwardly from the body 6 to contact the wellbore. The wheels 10 are spaced around a circumference of at least a portion of the body 6.

Figure 10:
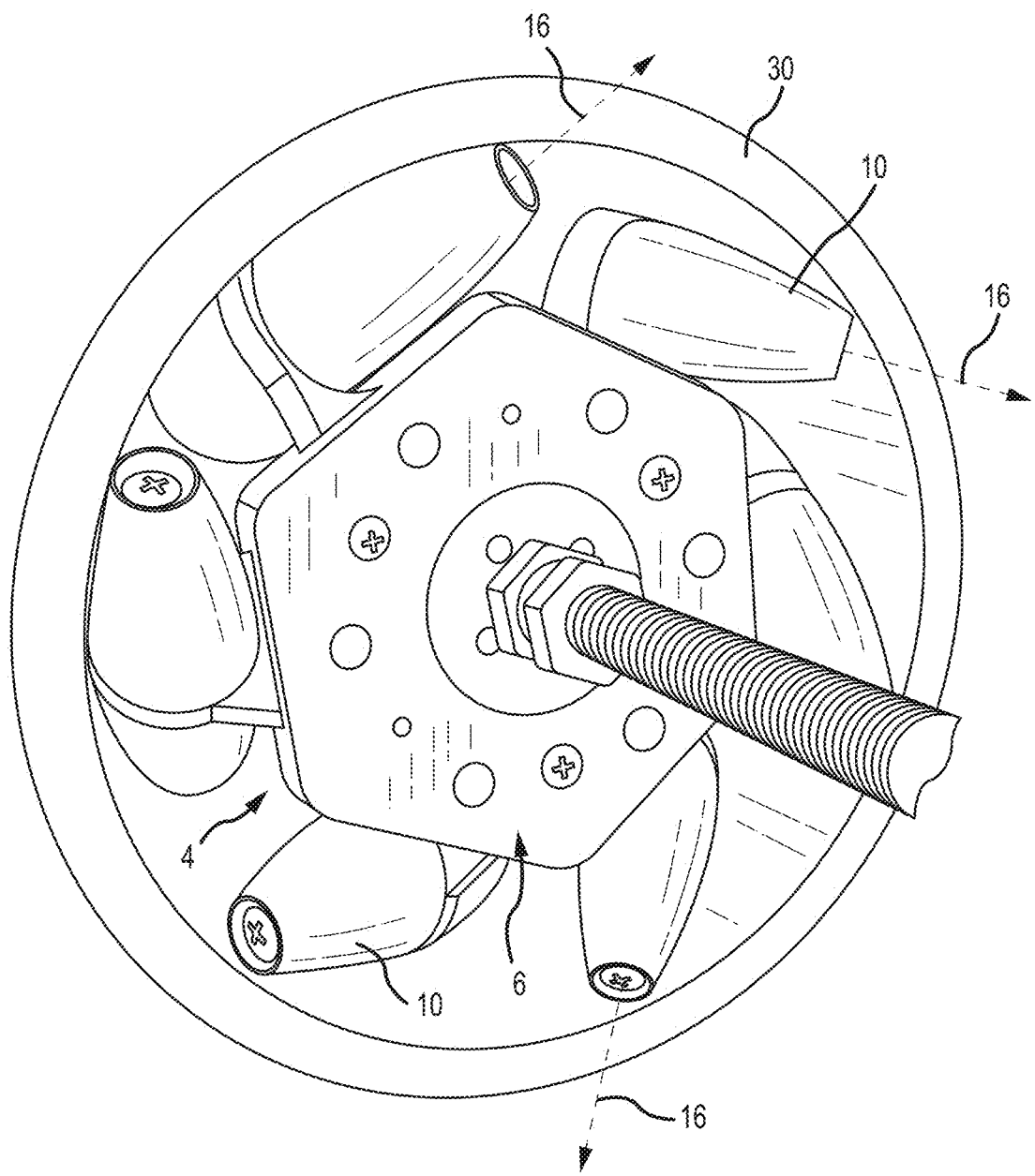
FIG. 10 is a partial end view illustrating wheels of the downhole tractor in operable contact with an interior surface of a cylindrical casing.

The tractor 4 is operable to generate linear movement and force within the wellbore. This is achieved by rotating the body 6. The wheels 10 are configured to convert the rotation of the tractor body 6 into both linear movement and force. More specifically, as generally illustrated in FIG. 10, the wheels 10 can be extended from the body 6 to be in operable contact with the inner surface of the wellbore or casing 30. In one embodiment, the wheels 10 are operable to rotate freely around a wheel axis 14. Accordingly, in at least one embodiment, the wheels are not driven by an external power source or mechanical connection. Accordingly, mounting of the wheels 10 is simplified compared to downhole devices that drive wheels that are connected to motors by gears or chains.

Figure 18:
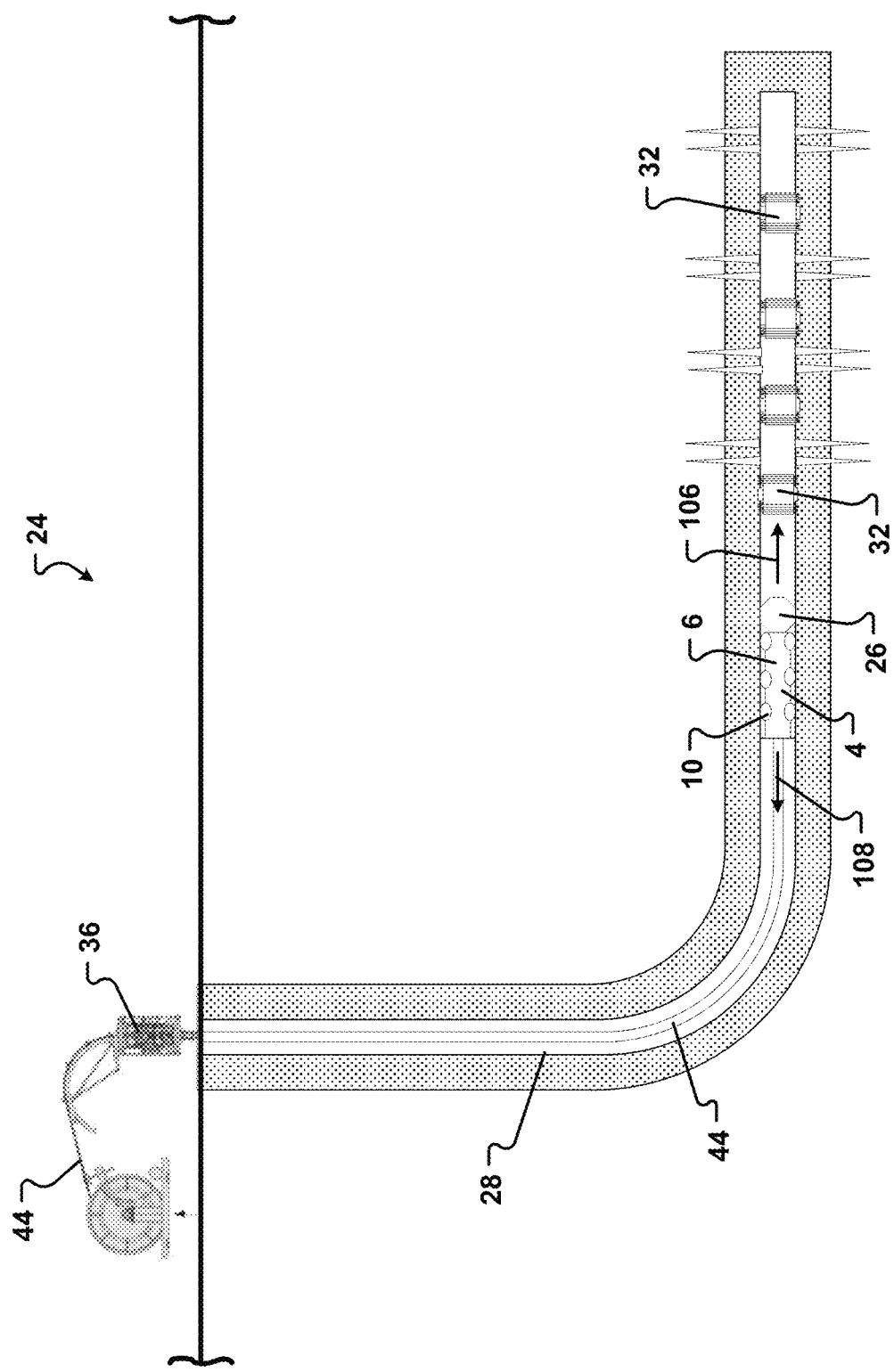
FIG. 18 is a schematic view of a downhole tractor interconnected to a coiled tubing unit according to one embodiment of the present disclosure.

As the body rotates, the wheels 10 advance along the wellbore in a spiral or helical path. The force generated by the wheels is generally parallel to the wellbore and to the longitudinal axis 8 of the tractor body 6. The force propels the tractor 4 linearly in the wellbore. The force generated by the wheels can also be used to perform an operation within the wellbore. For example, the force can be used to either drill up an object in the wellbore (like a plug 32 such as generally illustrated in FIG. 18) or to pull or push tubulars in and out of the wellbore. The tubulars can be bore-lining tubulars such as casing, liner, welded string, sand screens and conventional or expandable completions, wirelines, and/or coiled tubing. The tractor 4 can be connected to the tubular by a bearing, a lock, a J-lock, a threaded connection, a bayonet fitting, or by any other known connection system. The force generated by the tractor 4 may be in addition to gravity, surface tension, and snubbing forces exerted by surface equipment, such as a rig. Further, the force generated by the wheels 10 is not dependent upon rotation of casing or coiled tubing.

The wheels are configured to engage the wellbore, preferably without slipping. In one embodiment, an exterior surface 12 of the wheels 10 generates friction with the surface of the wellbore to prevent slipping. For example, in one embodiment the wheel exterior surface 12 includes one or more of grooves and projections to increase traction and prevent slipping relative to the interior surface of the wellbore. In another embodiment, the tractor can press the wheels 10 against the wellbore surface or a tubular surface of a casing or a liner of the wellbore to generate a normal force. The wheels 10 are also configured to overcome obstacles, such a sand or cuttings or opposing forces (such as friction) that would prevent the linear movement of the tractor 4 and interconnected tools or equipment, such as an attached tubular string.

In one embodiment, the wheels 10 are arrayed in a pattern similar to an Archimedes screw. Accordingly, the rotation of the tractor body 6 can assist with the transport of solids past the tractor 4. In this manner, large non-uniform cuttings (including pieces of bridge plugs) that may get stuck in or interfere with the operation of prior art downhole tractors can move past the tractor 4. The spiral pattern of the wheels 10 is also able to use higher velocities of annular fluid flow along the wheels to further enhance transport of solids past the tractor 4.

Additionally, or alternatively, the wheels 10 can be extended or retracted relative to the tractor body 6. Specifically, a distance between the wheel exterior surface 12 and the tractor body 6 can be adjusted by moving the wheels closer to, or away from, the longitudinal axis 8. In this manner, the wheels 10 can selectively be moved into, or out of, contact with an interior surface of a casing or the wellbore.

Additionally, the wheels 10 can move radially relative to the tractor longitudinal axis 8 to account for hole irregularities and diameter changes such as caused by washouts and different diameters of sections of casing. In one embodiment, the wheels 10 can automatically adjust their position so that the wheels 10 apply a substantially constant force to the wellbore surface regardless of well diameter or irregularities. Optionally, each wheel 10 can be individually adjusted relative to the longitudinal axis 8. For example, a first wheel 10 can be extended outwardly while a second wheel is retracted inwardly.

In one embodiment, the wheels 10 are biased outwardly from the tractor body. Alternatively, the wheels 10 can be biased inwardly and moved outwardly by a hydraulic or electric force. Accordingly, if hydraulic pressure or power is lost, the wheels can retract inwardly to facilitate retrieval of the tractor 4 from the wellbore.

Figure 15A:
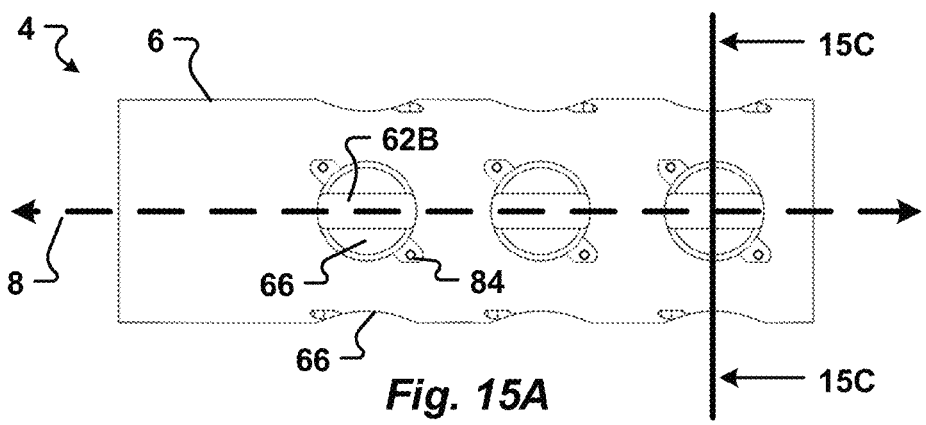
FIG. 15A is a side elevation view of a body portion of a downhole tractor according to one embodiment of the present disclosure.
Figure 15B:
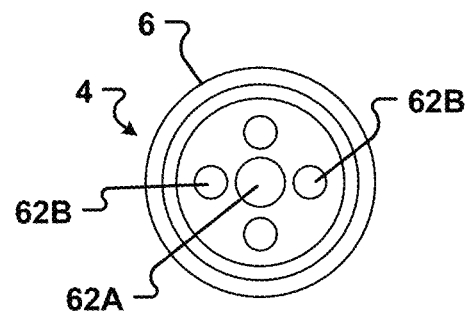
FIG. 15B is an end view of the tractor body of FIG. 15A.
Figure 15C:
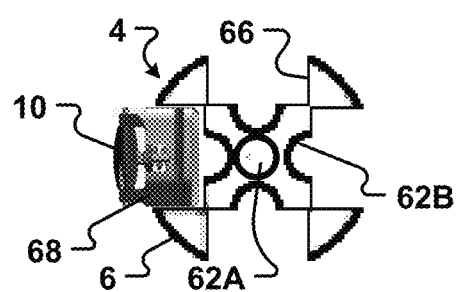
FIG. 15C is a cross-sectional view of the tractor body taken along line 15C-15C of FIG. 15A and showing a wheel mount positioned in an aperture formed in the tractor body.
Figure 15D:
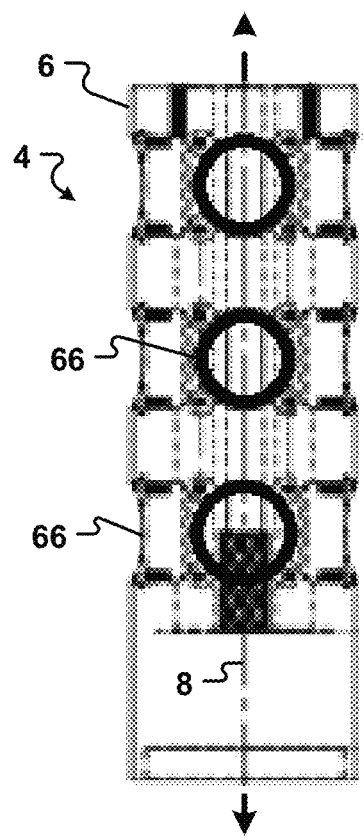
FIG. 15D is another side elevation view of the tractor body of FIG. 15A and illustrating bores through the tractor body in hidden lines.
Figure 15E:
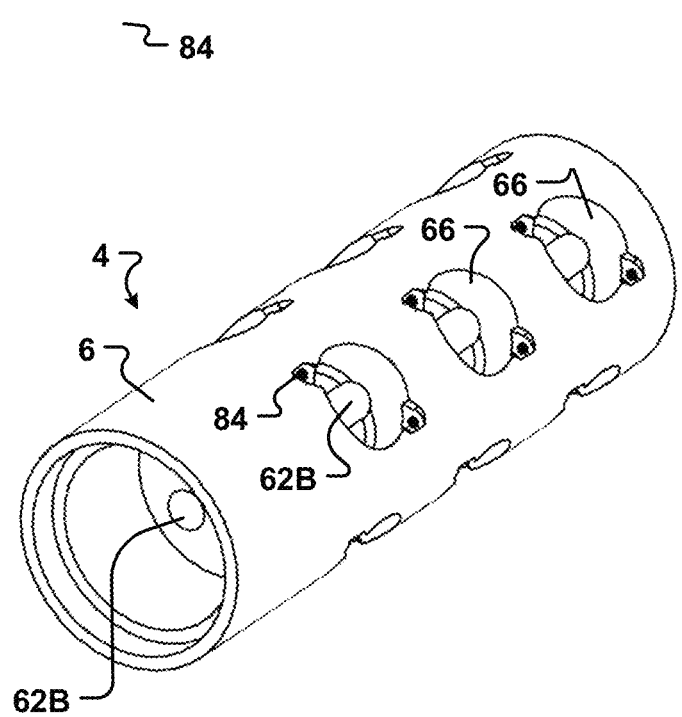
FIG. 15E is a side perspective view of the tractor body of FIG. 15A.

In one embodiment, the wheels 10 can retract at least partially into the body 6 to decrease the exterior diameter of the tractor 4. For example, the tractor 4 may optionally include a recess or pocket 66 associated with each wheel (such as generally illustrated in FIG. 15E). The wheels 10 can retract at least partially into the pocket 66. In one embodiment, the pocket has a depth that is greater than a maximum diameter of the wheels. Accordingly, the wheels 10 can withdraw into the pockets such that no portion of the wheels extends beyond the exterior of the tractor body 6.

In one embodiment, the tractor 4 is configured to adjust the magnitude of the normal force applied to the wheels 10 depending upon conditions within the wellbore. For example, the tractor 4 can adjust force applied to the wheels 10 based on surface friction and the texture of the wellbore surface or casing. In one embodiment, the tractor 4 can alter loading to provide a predetermined normal force to push the wheels 10 against the wellbore surface, such as illustrated in FIG. 10.

Optionally, the tractor includes a spring-loaded piston, similar to those in "locking" dogs used in slickline plugs or "locks". The spring-loaded piston can be actuated by a control mechanism to provide substantial normal force to the wheels.

Additionally, or alternatively, the tractor may include one or more actuators interconnected to the wheels. The position of the wheels 10 with respect to the tractor body can be adjusted by the actuators. The actuators can include one or more of a pump, a piston, a spring, a pneumatic system, a hydraulic system, and an electric drive. The actuators can be activated to adjust the normal force generated by the wheels. Optionally, a piston or wheel mount 68 can include an internal spring configured to retract the wheels 10 when hydraulic pressure of the piston is bled off, as generally illustrated in FIG. 14C.

In one embodiment, the actuators can be activated by a signal from a control unit 38 at the surface. For example, a control unit 38 at the surface (such as illustrated in FIG. 1.9) can be interconnected to the tractor 4. A signal generated by the control unit can activate the actuators.

The control unit 38 can include a wireline 40 placed internal to coiled tubing 44. The wireline can be fed through the coiled tubing 44 until the wireline is accessible at both ends of the coiled tubing for connection to the control system 38 at the surface and to the tractor 4 for use in the wellbore 28. The tractor 4 can be interconnected to the coiled tubing 44 with a variety of connections known to one of ordinary skill in the art. Optionally, an antitorque system is used to interconnect the coiled tubing to the tractor to prevent the transfer of rotational force or torque between the tractor 4 and the coiled tubing 44.

Figure 20:
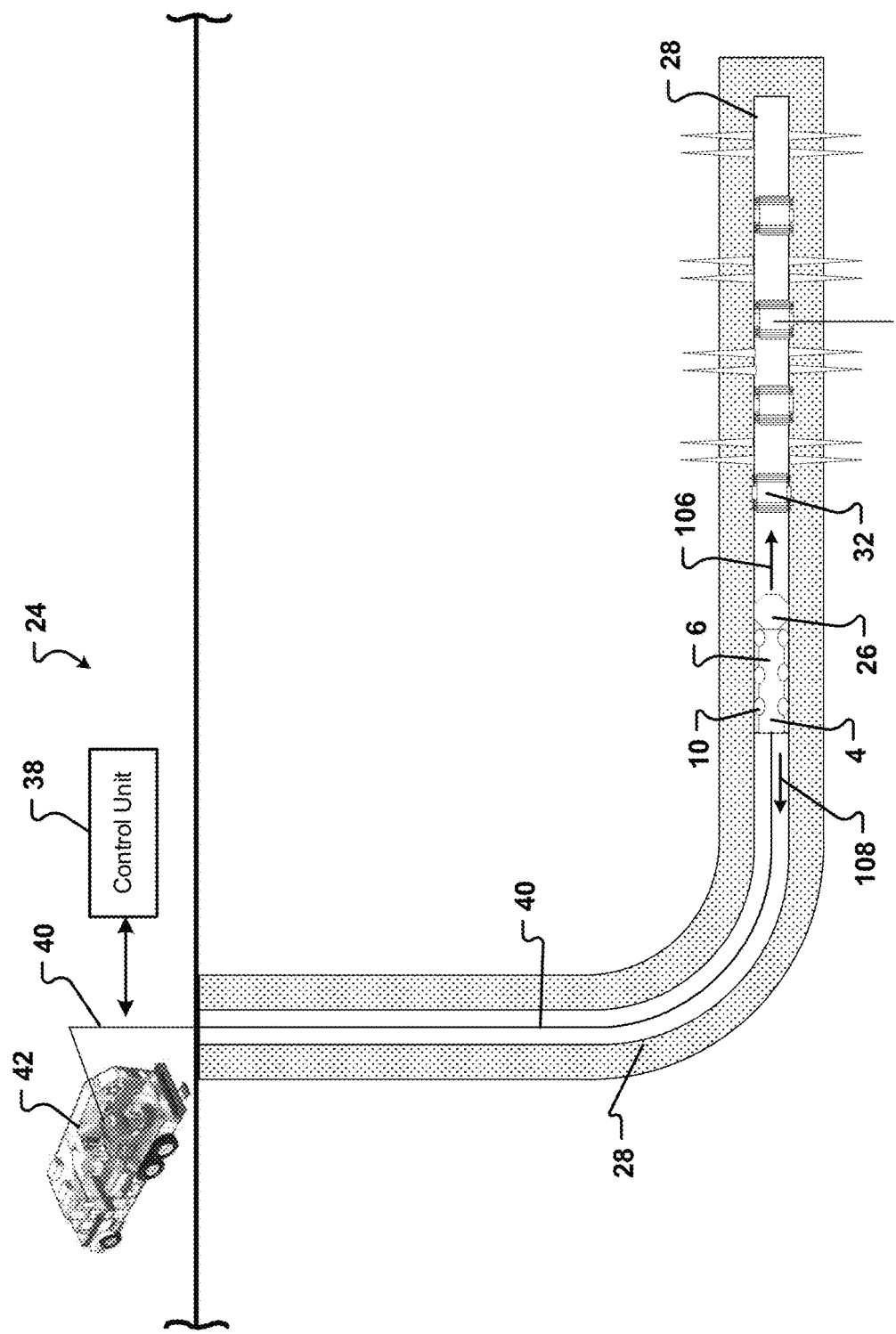
FIG. 20 is a schematic view of a downhole tractor interconnected to a wireline unit.

The tractor 4 can also be connected to a wireline without the use of coiled tubing, as illustrated in FIG. 20. The wireline 40 can transmit signals from the control unit 38 to actuators interconnected to the wheels. In this manner, the control unit 38 is configured to control actuators, such as hydraulic pumps or pistons, to deploy the wheels 10 with a predetermined amount of normal force. The control unit 38 can also send signals to the tractor 4 to alter an angle of the wheels 10 with respect to a longitudinal axis of the tractor. The signal from the control unit 38 can cause a wheel mount 68 associated with a wheel 10 to rotate around a mount axis 74 to alter an angle of a wheel axis relative to the longitudinal axis.

Figure 13A:
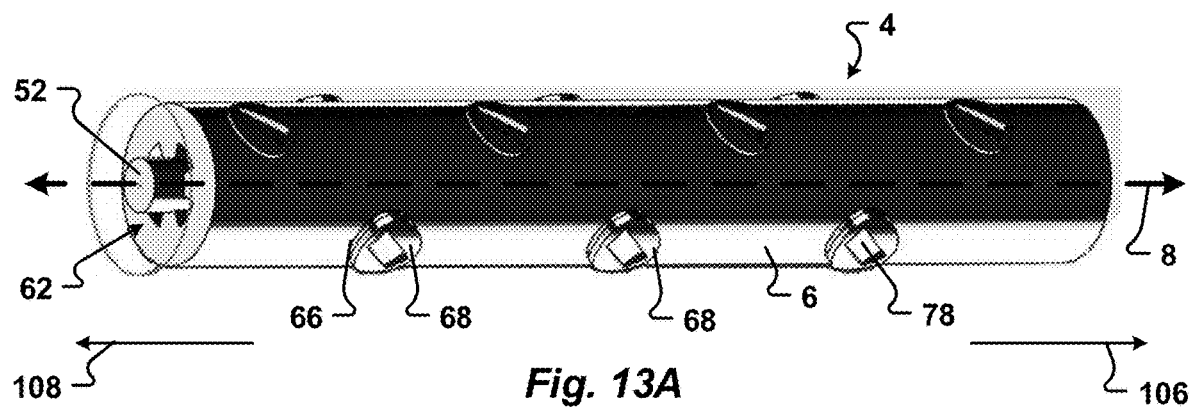
FIG. 13A is a side elevation view of still another downhole tractor of the present disclosure.
Figure 13B:
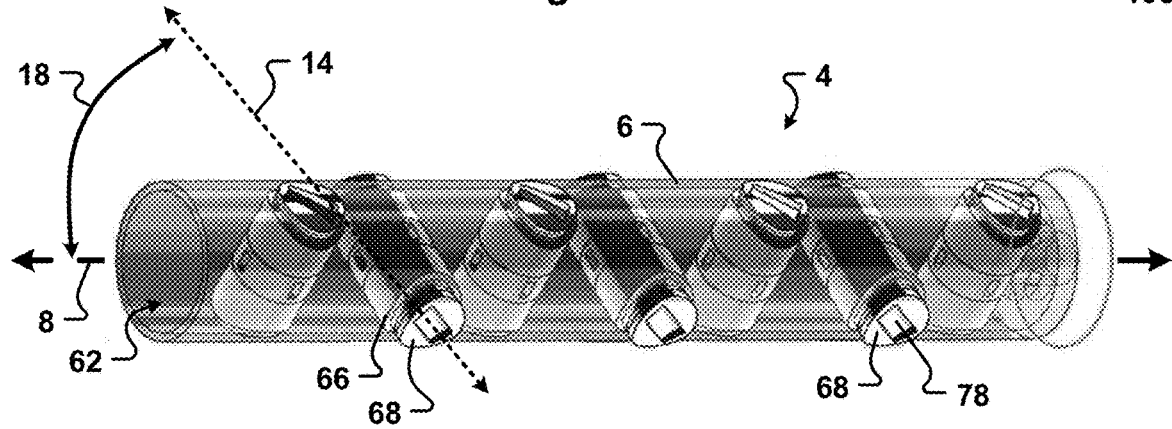
FIG. 13B is a side elevation view of the downhole tractor of FIG. 13A showing internal components within the tractor body.
Figure 13C:
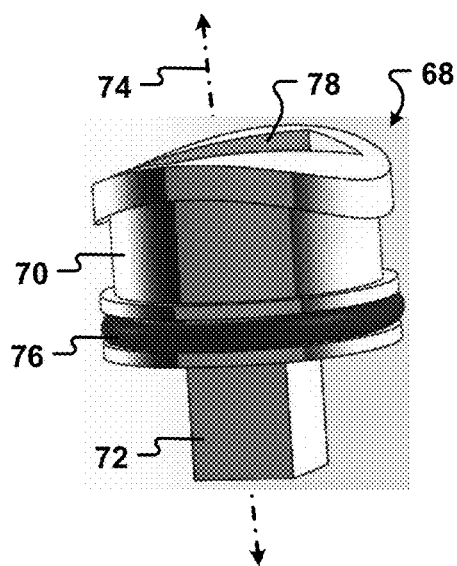
FIG. 13C is a perspective side elevation view of a wheel mount for a downhole tractor according to one embodiment.

Additionally, solenoid actuators, or similar electromagnetic devices, can also be used to deploy or extend the wheels 10 with significant normal force by simply running current through wireline 40. The solenoid actuators or electromagnetic devices can move wheel mounts 68 (such as illustrated in FIGS. 13C, 14C, and/or 17B) inwardly or outwardly relative to the tractor body 6. In this manner, engagement of the wheels 10 with an inner surface of the wellbore 28 or casing 30 can be precisely controlled. In one embodiment, the solenoid actuators or electromagnetic devices can also rotate the wheel mounts 68 around their mount axes 74.

In one embodiment, the wheels 10 are Mecanum wheels. As will be appreciated by one of skill in the art, Mecanum wheels have an axis of rotation 14 which is transverse to a force vector 16 generated by rotation of the wheels, as generally illustrated in FIG. 11A. Accordingly, Mecanum wheels facilitate movement of the tractor 4 forward or backward in the wellbore in a direction which is transverse to a direction of wheel rotation. In contrast, conventional wheels allow movement only in a direction perpendicular to the axis of rotation. An example of a Mecanum wheel is described in U.S. Pat. No. 3,876,255 which is incorporated herein by reference in its entirety.

In one embodiment, the wheels 10 generate a force vector 16 that is at a predetermined angle to the axis of rotation 14 of the wheel. In one embodiment, the force vector 16 is at an angle of approximately 45° to the axis of rotation 14 of the wheel. However, the wheels 10 can be configured to generate a force vector at other angles relative to the axis of rotation 14. In one embodiment, the wheels 10 are configured to generate a force vector 16 which is at an angle of from about 10° to about 80° to the axis of rotation 14.

Figure 11C:
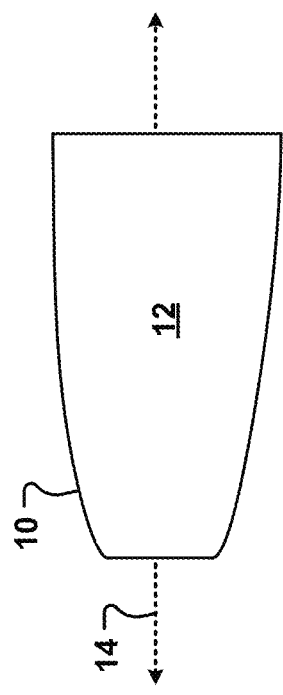
FIGS. 11A-11D are front elevation views of wheels of embodiments of the present disclosure.
Figure 11D:
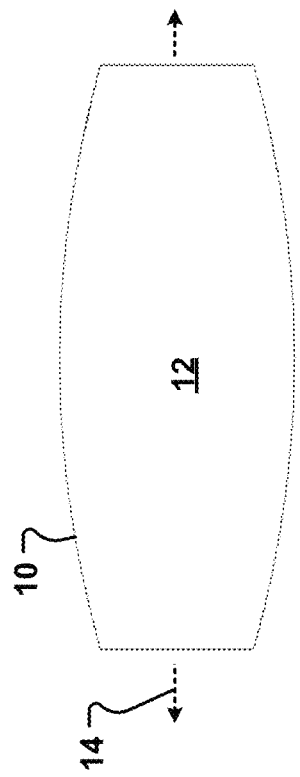
Figure 11A:
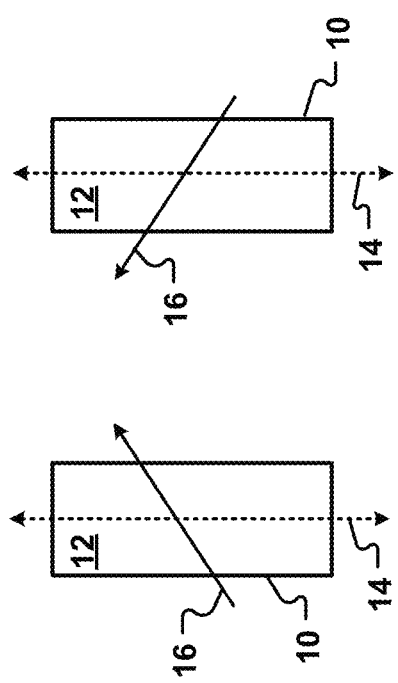
Figure 11B:
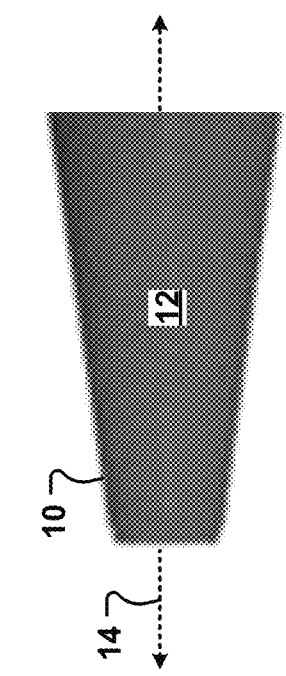

Referring now to FIGS. 11B, 11C and 11D, in one embodiment, the wheels 10 have an elongate shape extending along a wheel axis 14. In one embodiment, the wheels have a frusto-conical shape. Accordingly, an exterior surface 12 of the wheels is set at a predetermined angle relative to the wheel axis 14. Referring now to FIG. 11B, in one embodiment, the exterior surface 12 is generally linear relative to the wheel axis 14. Optionally, and referring now to FIGS. 11C-11D, the wheel exterior surface 12 is curved relative to the wheel axis 14. Other shapes of wheels 10 are contemplated. More specifically, the wheels 10 can be made in a variety of sizes and shapes and formed of a variety of materials depending on the expected loading and downhole conditions. In one embodiment, the wheels 10 are formed plastic or metal. Optionally, the wheels can be made of a resilient material, such as rubber.

The exterior surface 12 of the wheels 10 is configured to contact an interior surface of the casing or a surface of the formation within an uncased portion of the wellbore 28. Optionally, the wheel exterior surface 12 is adapted to increase traction with the interior surface. The roughness of the surface of the wheels can be enhanced with a variety of treatments or materials including the incorporation of "studs" or protrusions similar to studded tires. Additionally, or alternatively, treads or grooves may be formed on the exterior surface.

Referring now to FIG. 1, in one embodiment, the angle 18 of the wheels 10 relative to the longitudinal axis 8 of the tractor 4 can be adjusted. Optionally, the wheels 10 can pivot or rotate up to 360° around an axis 74 of a wheel mount 68 and with respect to the longitudinal axis. Rotating the wheels 10 alters the angle 18 between the wheel axis 14 and the tractor longitudinal axis 8. In this manner, the rate of movement of the tractor 4 relative to the wellbore can be altered. More specifically, the rate of movement of the tractor can be adjusted by increasing, or decreasing, the angle 18 of the wheel axes 14 with respect to the longitudinal axis 8.

In one embodiment, a wheel 10 can be rotated such that the wheel axis 14 is substantially parallel to the longitudinal axis 8. The wheels 10 can also rotate to place the wheel axes 14 transverse to the tractor longitudinal axis 8. For example, the wheels can be set such that the wheel axes generally spiral around the tractor body 6 in a pattern similar to threads on a screw. In one embodiment, the wheels can rotate to orient the wheel axes 14 approximately perpendicular to the longitudinal axis.

In one embodiment, the angle 18 of the wheels relative to the longitudinal axis can be used to control a direction of movement of the tractor 4 within the wellbore. In another embodiment, altering the angle 18 of the wheels adjusts an amount of force generated by the tractor 4. The rate of rotation of the tractor body 6 may also be altered by changing the angle 18 of the wheel axis relative to the longitudinal axis. In one embodiment, the tractor 4 can automatically alter the angle 18. In another embodiment, the angle 18 of the wheels can be adjusted in response to a signal received from a control system 38.

In one embodiment, tractors 4 of all embodiments can have a first velocity when the wheel axis 14 is oriented at a first angle 18 of approximately 45° relative to the longitudinal axis 8. The tractors 4 can have a second slower velocity when the wheel axis 14 is oriented at a second angle 18 of approximately 30°. In one embodiment, the tractors 4 generate a first force when the wheel axis is at the first angle 18 of approximately 45° that is less than a second force when the wheel axis is at the second angle 18 of approximately 30°.

Figure 4:
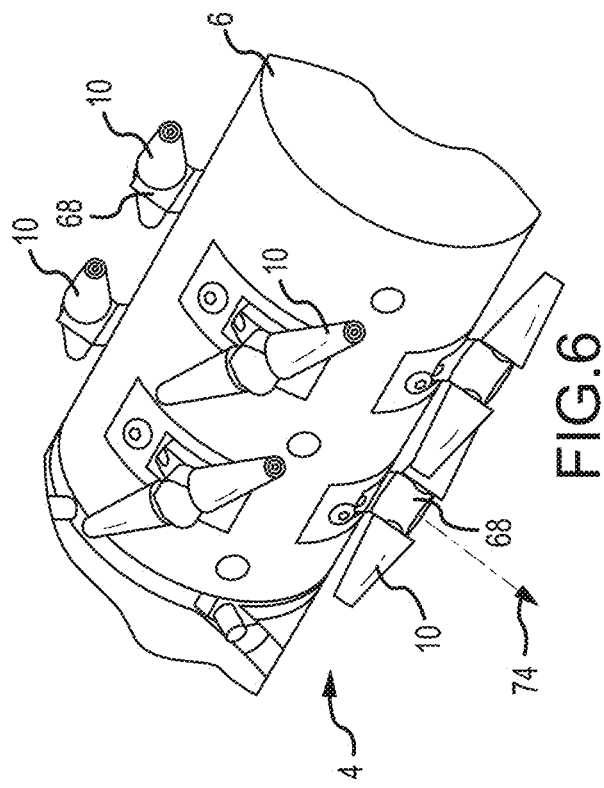
FIG. 4 is a perspective view of a portion of a downhole tractor of one embodiment of the present disclosure in which a clutch mechanism is shown in an engaged position.
Figure 5:
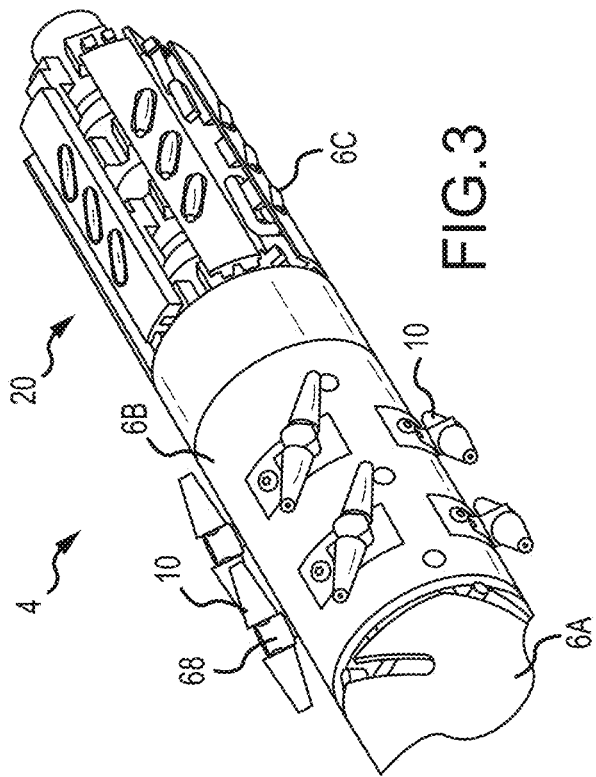
FIG. 5 is a side elevation view of a portion of a downhole tractor showing an arrangement of wheels on a body of the downhole tractor according to one embodiment.
Figure 6:
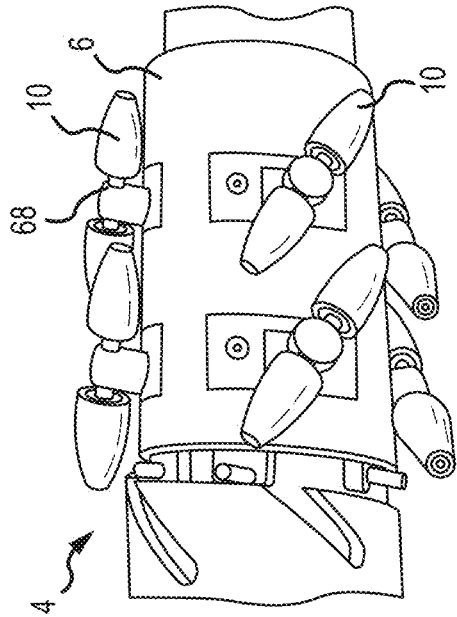
FIG. 6 is a partial perspective view of a downhole tractor providing another view of the wheels on the tractor body.

Referring now to FIGS. 3-4, the tractors 4 of all embodiments may include a clutch system 20. The clutch system 20 may be positioned at a distal end 6C of the tractor 4. Engagement of the tractor with the wellbore may be controlled by the clutch system. In one embodiment, the clutch system 20 is activated by a normal force generated by contact of the tractor 4 with an obstruction within the wellbore, such as a plug 32.

The clutch system 20 can be configured to control engagement of the wheels 10 with the wellbore. In one embodiment, the clutch system 20 is operable to alter the angle 18 of the wheels relative to the longitudinal axis 8. In this manner, the clutch system 20 can change the orientation or angle of the wheels 10 to provide more rotation with less forward force to facilitate the slower linear motion necessitated by drilling through the plug. Optionally, the clutch system 20 can use an axial biasing element to assist the deployment and retraction of the wheel 10, such as when the tractor encounters an obstruction. The axial biasing element can be a spring.

Figure 7:
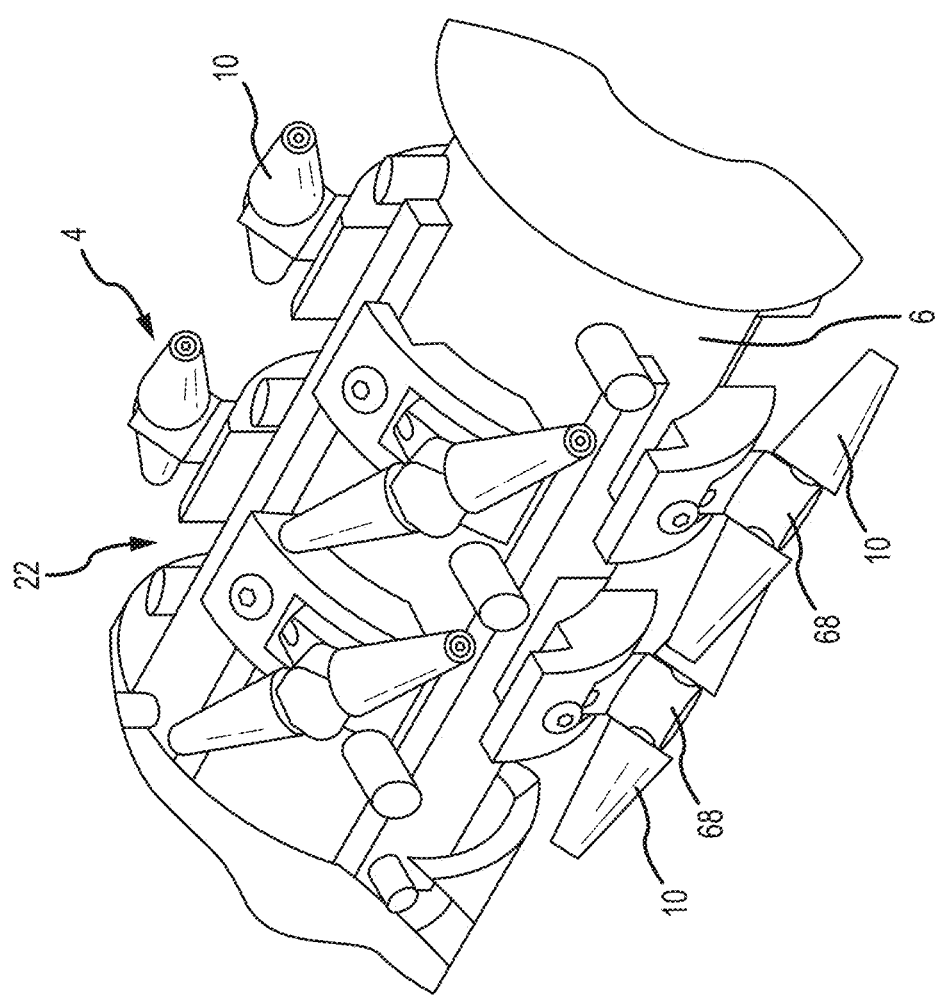
FIG. 7 is a perspective view of a portion of the downhole tractor illustrating a cam system configured to selectively move wheels of the downhole tractor against a surface within the wellbore.
Figure 8:
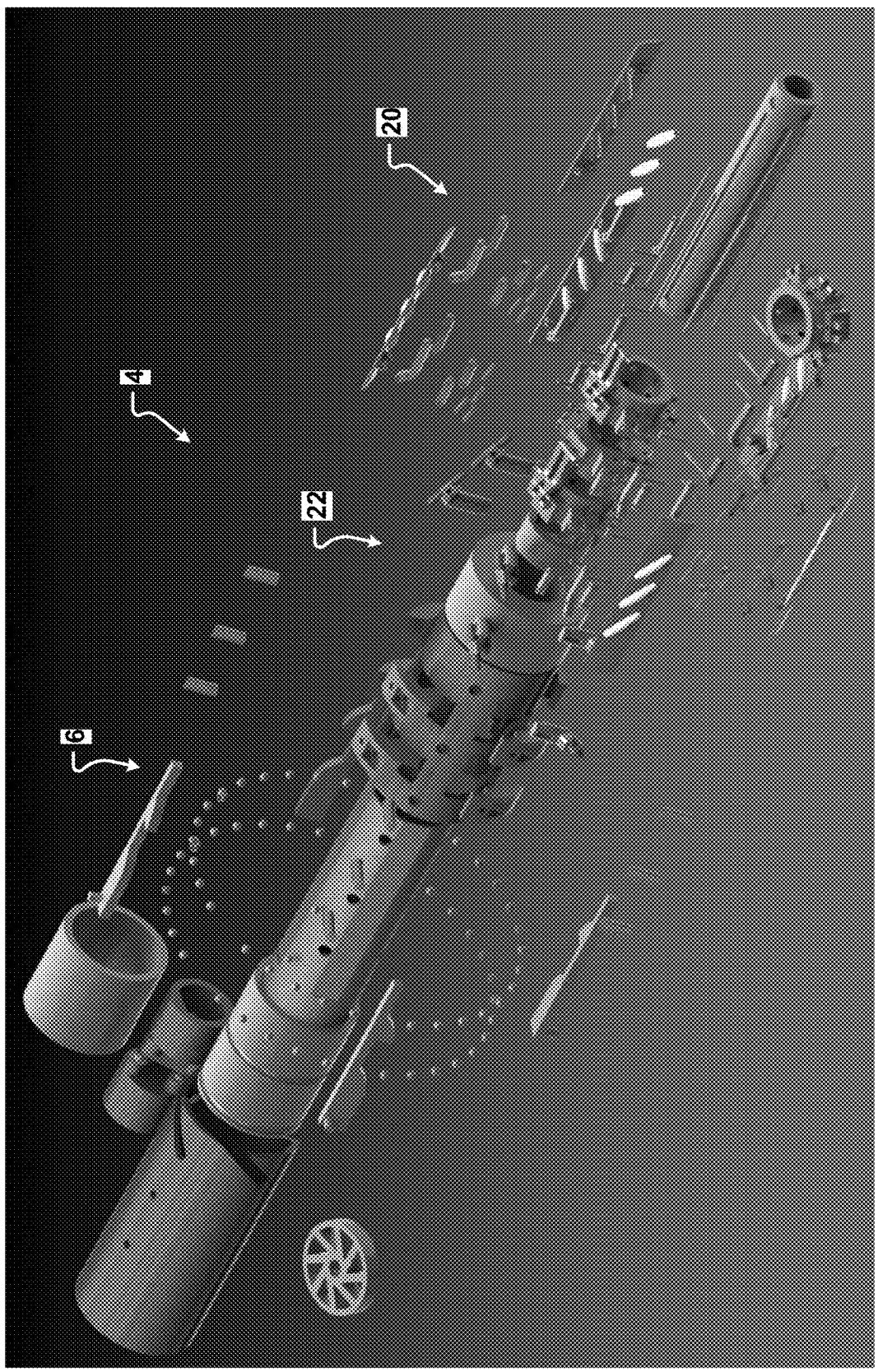
FIG. 8 is an exploded perspective view of a downhole tractor of one embodiment of the present disclosure.
Figure 9:
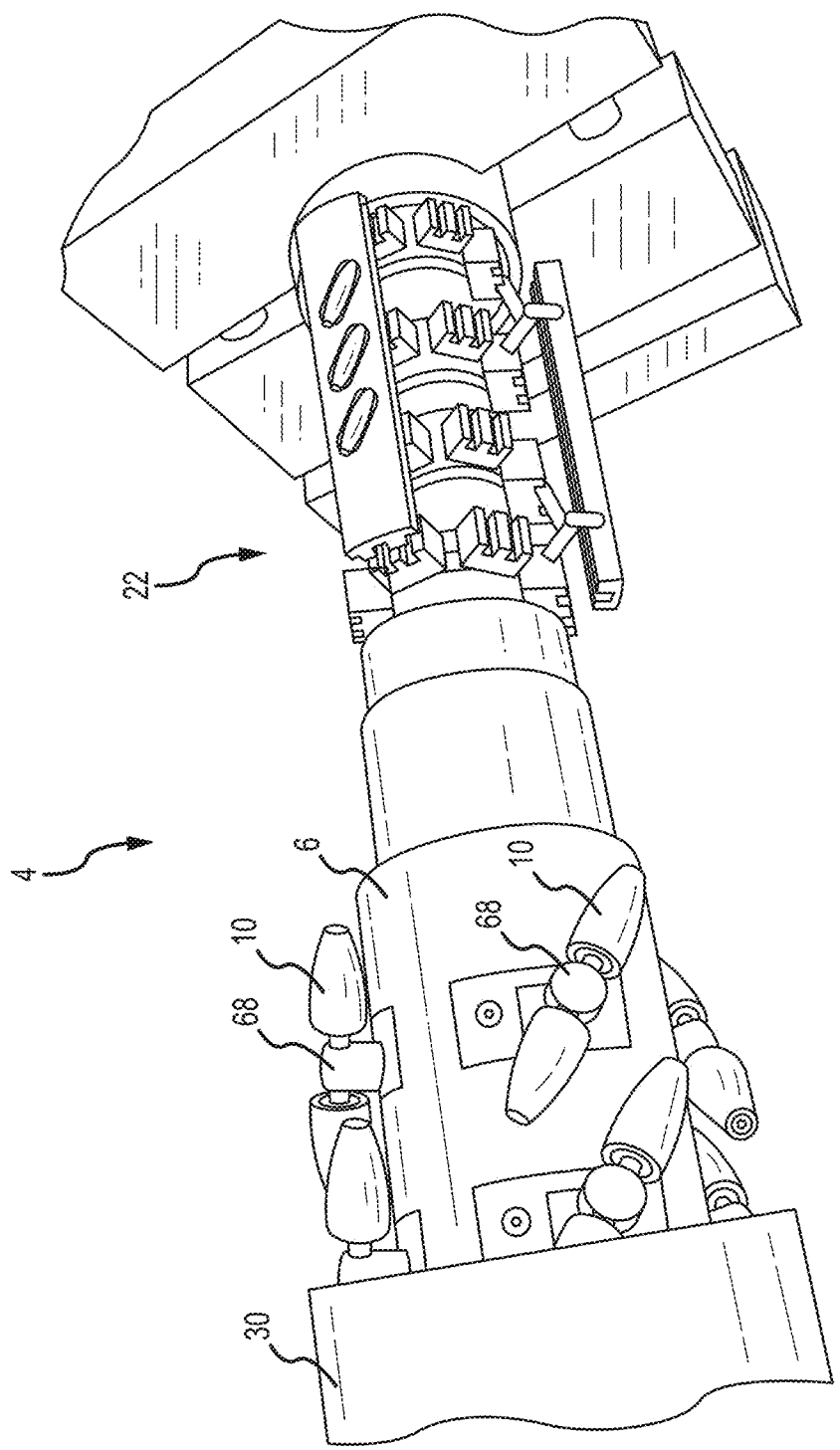
FIG. 9 is another partial view of a downhole tractor extending from a cylindrical casing.

The tractor 4 may also optionally include a cam system 22, generally illustrated in FIG. 7, to provide additional normal force for the wheels 10. The cam system 22 can move wheel mounts 68 associated with the wheels 10 inwardly and outwardly. Additionally, or alternatively, a cam could engage and disengage the wheels 10 from gripping the surface of the wellbore 28. In one embodiment, the cam system 22 activates (or engages) as the tractor body 6 rotates to achieve linear motion while the tractor body is attached on a tubing string (such as, but not limited to, coiled tubing or jointed pipe for the hydraulic mechanical system). In this manner, the cam system 22 drives the wheels 10 against the wellbore inner surface. The cam system 22 allows the tractor 4 to be inserted in the wellbore 28 without resistance from the wheels. For example, the cam system 22 can retract the wheels 10 when the tractor is inserted in the wellbore. The cam system 22 can also control when the tractor, or the wheels 10, engage the well casing.

In one embodiment, rotation of the tractor body 6 is caused by a rotary mechanical device interconnected to the tractor. The rotary mechanical device may be a hydraulic motor or a pump. The rotary mechanical device, in one embodiment, is configured to extract energy from the flow of fluid pumped through the wellbore 28. The rotary mechanical device can convert the fluid flow into rotation which is transferred to the tractor body. In this manner, the rotary mechanical device can selectively cause the tractor body 6 to rotate. Optionally, the rotary mechanical device may transfer force and rotation to a tool interconnected to a distal end of the tractor.

Additionally, or alternatively, the tractor 4 can be configured to extract energy from fluid flowing through the wellbore into rotation of the tractor body 6. In one embodiment, the tractor body is configured to rotate in response to fluid flowing past or through the tractor 4. Optionally, the tractor 4 may include a deflection plate, vanes, or blades that extend from an exterior surface of the body 6. In this manner, the tractor 4 can convert the fluid flow in the wellbore and past the body into rotation of the body 6. Additionally, or alternatively, the tractor 4 can be configured to extract energy from fluid flowing through the tractor body 6 to rotate the tractor body. In one embodiment, a bore 62 (illustrated in FIG. 13) is formed through the tractor body 6 to facilitate the flow of fluid through the tractor 4.

Optionally, the wheels 10 can be used to extract energy from the fluid. For example, in one embodiment, the wheels 10 are arranged in a spiral, or as an Archimedes screw, such that the tractor body 6 rotates in response to the flow of fluid within the wellbore. Additionally, or alternatively, the wheels 10 can move cuttings and other materials within the wellbore away from the tractor.

Referring now to FIGS. 12A-12C, a tractor 4 of another embodiment of the present disclosure is generally illustrated. The tractor 4 can include any of the features as the tractors described in conjunction with FIGS. 1-10. The tractor 4 can be coupled to a fluid or mud motor 50. The mud motor 50 can be placed anywhere relative to the tractor 4 in the casing, tubing, or drill string. For example, the mud motor 50 can be coupled to an uphole or proximal end of the tractor, a downhole or distal end of the tractor, or between one or more body portions 6 of the tractor 4. All embodiments of tractors 4 described herein can be coupled to a mud motor 50.

Figure 16:
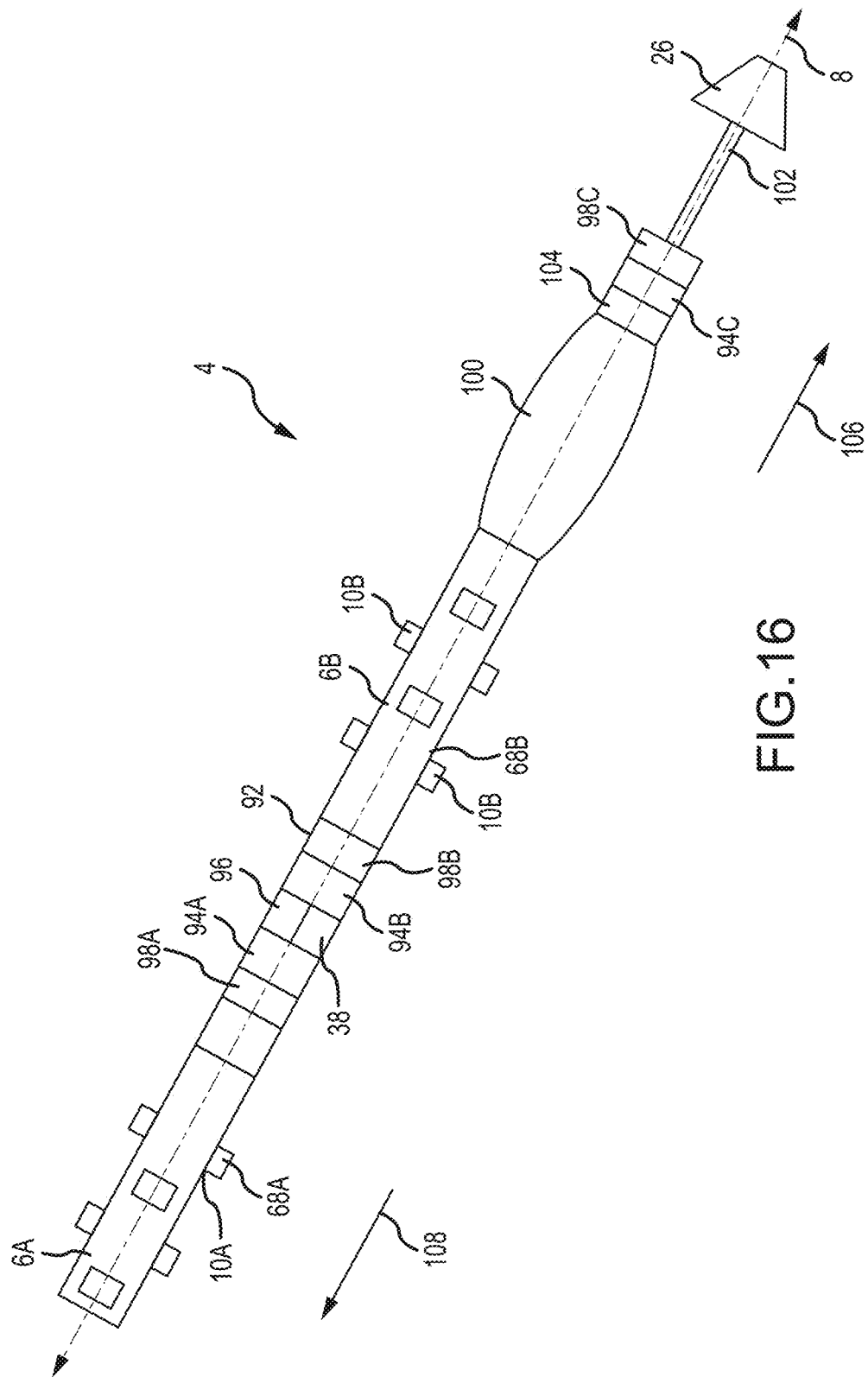
FIG. 16 is a side perspective view of an electric tractor according to one embodiment of the present disclosure.

The mud motor 50 is operable to extract energy from fluid flowing through the wellbore and to convert the energy into torque. The torque can be selectively transmitted to the tractor body 6 to cause the tractor body to rotate. In one embodiment, a gearbox 98 (such as illustrated in FIG. 16) is configured to selectively transfer torque from the mud motor 50 to the tractor body 6.

Optionally, the motor 50 can be either a reverse Moineau motor or any other type of mud motor configured to extract energy from fluid flowing through the wellbore. For example, the tractors 4 of embodiments of the present disclosure can use any known mud motor to provide rotation and torque to the tractor body 6. This removes the need to have a reverse Moineau or other mud motor mechanism within the tractor body that would have to share the internal space of the tractor body 6. Existing mud motors can be used to provide power to the tractor 4 broadening the usefulness of the tractors 4 of the present disclosure. Accordingly, the source of the rotation is not critical to the tractor 4 of the present disclosure, only that torque is provided to the tractor 4 to rotate the body 6.

In one embodiment, the motor 50 is a reverse Moineau motor. In this embodiment, a sealed bearing such as those used in rotating liner hangers, can couple the rotatable tractor body 6 to the reverse Moineau motor 50. The sealed bearing can be positioned such that other portions of the tubular string downhole 106 and/or uphole 108 from the tractor 4 do not rotate. Examples of suitable sealed bearings are described in U.S. Pat. No. 4,033,640 and U.S. Pat. No. 4,190,300 which are each incorporated herein by reference in their entireties. All embodiments of tractors 4 described herein can be used with a reverse Moineau motor 50, including tractors 4 described herein with a body configured to extract energy from the flow fluid to generate torque and rotate the body as well as the electrically powered tractors 4.

The reverse Moineau motor 50 is configured to extract energy from hydraulic fluid flowing through the wellbore to rotate the tractor body 6. More specifically, the reverse Moineau motor 50 generally includes a rotatable motor body 54 with an internal cavity 58 that defines an outer stator 56. A rotor 60 is locked within the cavity 58 in a non-rotating manner. The rotor can be connected to the non-rotating portions of a tubular string within the wellbore. In this manner, the rotatable body 6 of the tractor 4 can be decoupled from the non-rotating rotor 60 and non-rotating portions of the tubular string, both above the tractor 4 and below the tractor 4 toward the distal portion of the wellbore.

As fluid passes through the internal cavity 58 of the reverse Moineau motor 50, the stator 56 rotates around the stationary rotor 60. The reverse Moineau motor 50 can selectively supply torque and rotation to the body 6 of the tractor 4 by locking the rotor 60 in place and allowing the outer stator 56 and motor body 54 to rotate around the locked rotor. The rotor 60 can be interconnected to a shaft 52 that connects the motor 50 to a second motor or another non-rotating element of the tractor 4.

Figure 13D:
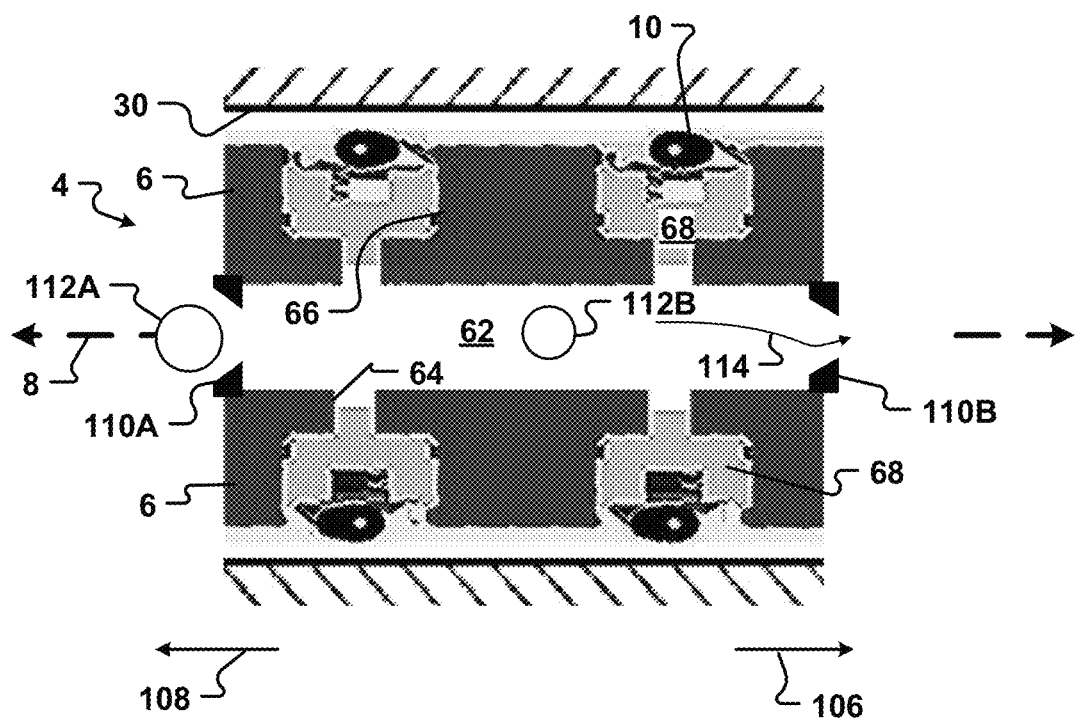
FIG. 13D is a partial cross-sectional side elevation view of the downhole tractor of FIG. 13A and illustrating wheel mounts in a retracted position such that wheels of the tractor are spaced from an interior surface of a section of tubular casing.

Optionally, a bore 62 can extend through the rotor 60. The bore 62 can be used to divert fluid away from the internal cavity 58. In this manner, fluid can be directed through the bore 62 to alter the rate of rotation (or stop the rotation) of the rotatable motor body 54. In one embodiment, fluid can be directed into, or diverted away from, the rotor bore 62 by a ball dropped into the wellbore. For example, the reverse Moineau motor 50 can optionally include a ball seat 110 (such as generally illustrated in FIG. 13D). The ball seat can be configured to alter the flow of fluid through the reverse Moineau motor. In one embodiment, a ball seat is configured to direct fluid through the internal cavity 58 when a ball is retained in the ball seat. In this manner, the reverse Moineau motor can be activated and the rotatable motor body 54 will rotate in response to a ball dropped in the wellbore. In another embodiment, a ball seat will direct fluid through the rotor bore 62 when a ball is retained in the ball seat. Accordingly, the reverse Moineau motor can be deactivated and the rotatable motor body 54 will stop rotating when a ball is retained in the ball seat. Optionally, the tractor 4 can include a first ball seat configured to activate the reverse Moineau motor and a second ball seat configured to deactivate the reverse Moineau motor.

Additionally, or alternatively, in another embodiment, one or more features of the tractor 4 can be hydraulically actuated, for example, with an object transported by fluid in the wellbore to the tractor. The object can be a ball.

In one embodiment, the tractor 4 includes a sleeve that can be actuated by the object or ball in the fluid. The sleeve is configured to alter the flow of fluid through the tractor or a motor 50. For example, movement of a sleeve can shift the flow of fluid through the motor 50 to alter operation of the tractor. In one embodiment, when the sleeve is in a first position, the fluid can flow through a bore 62 through the rotor 60 of a motor 50. In this manner, in the first position the rotatable motor body 54 can remain stationary relative to the longitudinal axis 8. When the sleeve is moved to a second position, the fluid can flow to the internal cavity 58 between the rotor 60 and the outer stator 56 such that the rotatable motor body 54 can rotate around the longitudinal axis 8. In this manner, when the sleeve is in the second position, the motor 50 is activated and can provide torque and rotation to the tractor body 6 or other rotatable features of the tractor, such as a tool 26. Optionally, the sleeve can be biased in one of the first position and the second position.

The sleeve can be actuated in a manner similar to actuation of a ball drop hydraulic underreamer. Systems actuated by a ball drop are known to those of skill in the art and are described in U.S. Pat. Nos. 5,392,862, 8,991,505 and 9,562,419 which are incorporated herein by reference in their entirety.

To activate the motor 50, in one embodiment a ball is added to the fluid in the wellbore and transported to the tractor 4. When the ball reaches the tractor, the ball can engage the sleeve and move the sleeve to one of the first position and the second position. In this manner, the ball can actuate one or more features of the tractor. For example, the ball can move the sleeve to the second position in which the motor 50 provides torque to rotate the tractor body 6.

Optionally, the torque can also activate a tool 26 at one or both of the downhole end 106 and the uphole end 108 of the tractor. In one embodiment, the tool 26 positioned at the uphole end of the tractor is a hydraulic back reamer for coiled tubing. A back reamer suitable for use with tractors of the present disclosure is described in U.S. Pat. App. Pub. 2003/0070841 which is incorporated herein in its entirety.

The back reamer can be activated by a ball drop that engages the sleeve. When the sleeve moves to the second position, the motor can provide torque to rotate the back reamer. The rotation can actuate arms of the back reamer to clear obstructions uphole of the tractor. The obstructions may be cuttings or proppant that have built up in the wellbore. As will be appreciated by one of skill in the art, cuttings and proppant can accumulate in the wellbore when not removed just with fluid flow. This presents a danger to operators and can cause objects, such as a coiled tubing drilling assembly to become stuck in the well. As the back reamer clears or disperses the obstructions, the tractor can move in the uphole direction 108 in the wellbore.

Additionally, or alternatively, the reverse Moineau motor 50 can be coupled to a tractor body 6 that cannot rotate on its own. More specifically, the reverse Moineau motor 50 can be coupled to one or more body portions 6 of a tractor to rotate the body portions as generally illustrated in FIGS. 12A-12B. In this manner, the tractor body 6 does not require an internal cavity configured to extract energy from the fluid to rotate the body 6. Accordingly, the body 6 can have more room internally to facilitate the actuation and engagement of the tractor, and for the wheels 10 to retract or extend from the body 6, without the space limitation required by one or more of an internal rotor, an internal stator, and external fins or blades.

One benefit of coupling a reverse Moineau motor 50 to a tractor body portion 6 is that multiple tractors 4 can be positioned at various points in a tubular string. For example, the non-rotating rotor 60 can be connected to the tubular string at one or both of a downhole end 106 and an uphole end 108 of the tractor 4. In this manner, the tubular string does not rotate when the tractor 4 is actuated (and rotates) by torque received from the reverse Moineau motor 50. Accordingly, the rotation of the tractor body 6 is decoupled from the tubular string.

In one embodiment, a motor 50 can transfer torque to a gearbox 98 (such as illustrated in FIG. 16). The gearbox 98 can then selectively transfer at least some of the torque from the motor to a tractor body 6.

Tractors 4 of the present disclosure can be of any size and may include any number of motors 50 and body portions 6. Optionally, the first body 6A can be flexibly coupled to the second body 6B. For example, in one embodiment the shaft 52 includes a flexible joint.

In one embodiment, a tractor 4 can have a length of approximately 30 feet. In one embodiment, a tractor 4 can include a first mud motor 50A, a tractor body 6, and a second mud motor 50B. Optionally, the first and second mud motors 50A, 50B and the tractor body 6 can have a length of up to about 13 feet, or approximately 10 feet. Additionally, or alternatively, one or more of the mud motors 50A, 50B, and the tractor body 6 can have a different length. More specifically, the respective lengths of the mud motors 50A, 50B, and tractor body 6 can be selected based upon desired properties of the tractor 4, such as the amount of torque generated by the motors, the velocity generated by the tractor body 6, and the linear force generated by the wheels 10 of the tractor body.

The mud motor 50 has a diameter that can be the same as, or different from, a diameter of the tractor body 6. In one embodiment, the motor diameter is less than the body diameter. Alternatively, the motor diameter can be equal to, or greater than, the body diameter.

The first and second mud motors 50A, 50B can optionally be interconnected. In one embodiment, the first and second mud motors are fixed together by a non-rotating shaft 52. The shaft can extend through a cavity of a tractor body 6A. In this manner, the tractor body 6 can rotate and transmit torque to the wheels 10 thereon to engage the casing 30 or wellbore wall. Optionally, a second tractor body 6B can be rotatably coupled to the downhole end of the second mud motor 50B as generally illustrated in FIG. 12A. Alternatively, the first and second mud motors 50A, 50B can independently operable.

Referring now to FIGS. 13A-13D, another embodiment of a tractor 4 of the present disclosure is generally illustrated. The tractor 4 can include any of the components of other tractor embodiments described herein. For example, in one embodiment, the tractor 4 can be coupled to an electric motor that transmits torque to rotate the tractor body 6. Additionally, or alternatively, the tractor 4 can be coupled to a mud motor 50 as described herein. For example, the tractor 4 can be coupled to a reverse Moineau motor 50 or any other type of mud motor.

The tractor 4 generally includes a rotatable body 6. A bore 62 for fluid can extend through the body 6. The bore 62 may be oriented generally parallel to a longitudinal axis 8 of the body.

The body 6 can include apertures 66 to receive wheel mounts 68. In one embodiment, the apertures are generally perpendicular to the longitudinal axis 8. Optionally, the apertures can be spaced around the circumference of the body 6. In one embodiment, the aperture 66 have a generally cylindrical shape.

The wheel mounts 68 are extendably retained in the apertures 66. The wheel mounts 68 are similar to and have a similar function as hydraulic hold down buttons on packers known to those of skill in the art. Each wheel mount 68 is configured to retain a wheel 10. Although the wheels 10 are not illustrated in FIGS. 13A-13C for clarity, any wheel described herein can be used with the tractor 4 and affixed to the wheel mounts 68. The wheel mount 68 optionally includes a recess 78 to receive the wheel. In one embodiment, the wheels 10 are configured to rotate freely around wheel axes 14 relative to their associated mounts 68.

In one embodiment, the wheel mount 68 has a body 70. The body 70 can be generally cylindrical. Optionally, a shaft 72 extends from the body 70. Although the shaft 72 is illustrated in FIG. 13C with a rectangular shape, other configurations are contemplated. In another embodiment, the shaft 72 has a cylindrical shape configured to facilitate rotation of the wheel mount 68 around the mount axis 74. Optionally, the wheel mounts described in conjunction with FIGS. 14C-14F and/or FIG. 17B can be used with the tractor 4.

The wheel mount 68 can include a seal 76 to prevent fluid from flowing out of the body aperture 66 to prevent loss of fluid pressure from within the body bore 62. The seal 76 can be an O-ring. Additionally, or alternatively, the seal 76 can be any type of known seal including quad rings or another seal material adapted to the conditions within the wellbore including specific pressures, temperature or fluid applications. For example, the seal 76 and other components of the tractor 4 can be adapted or selected to operate and withstand temperatures of up to approximately 375° F. and pressures of up to approximately 20,000 psi. In one embodiment, the seal 76 is an elastomer such as a nitrile elastomer.

The wheel mount 68 is operable to telescope relative to the tractor body 6. More specifically, the wheel mount 68 can extend and retract radially relative to the tractor body 6 and the longitudinal axis 8. In this manner, the wheel mount 68 can extend outwardly to press an associated wheel 10 against a cylindrical inner surface of the wellbore or the casing 30 as discussed herein. The wheel mount thus exerts a radial, normal force on an associated wheel that is pressed up against the surrounding casing or wellbore. The wheel 10 can then convert rotation of the tractor body 6 into axial or linear motion and force for the tractor 4. The motion and force generated by the wheels 10 are oriented generally parallel to the longitudinal axis 8. Force and motion from the wheels can be directed either uphole or downhole as determined by the orientation or angle 18 of the axes 14 of the wheels 10 and/or a direction of rotation of the tractor body 6. When the tractor 4 is not needed to generate movement and/or force, the wheel mount 68 can retract such that the associate wheel 10 does not contact the wellbore or casing 30 such as generally illustrated in FIG. 13D.

The wheel mount 68 can be configured to orient a wheel axis 14 around which a wheel 10 rotates at a predetermined angle 18 relative to the longitudinal axis 8. In one embodiment, the wheel mount 68 can orient the wheel axis 14 at an angle 18 of approximately 45°. However, the angle 18 can be varied to alter the linear speed or force generated by the tractor 4.

In one embodiment, the wheel mount 68 can rotate around a mount axis 74. More specifically, the wheel mount 68 optionally can rotate up to approximately 360° around the mount axis 74. In this manner, the wheel mount 68 can alter the angle 18 of the wheel axis 14 from approximately 0° to approximately 180°.

Optionally, the wheel mounts 68 can extend outwardly is response to rotation of the tractor body 6. For example, in one embodiment, the wheel mounts 68 can extend outwardly in response to centrifugal force when the tractor body rotates. The wheel mounts 68 can include locks to prevent inadvertent or unintended extension of the wheels.

In one embodiment, the wheel mount 68 is configured to move outward in response to pressure from fluid flowing through the body 6. More specifically, when a pressure of fluid within the body bore 62 is greater than the wellbore annular pressure outside of the tractor 4 the wheel mount 68 can extend outwardly from the body. Optionally, each mount aperture 66 includes a fluid passageway 64 (illustrated in FIGS. 13D, 13E) to transmit fluid to an associated wheel mount 68 to provide a force to extend the wheels 10 radially to engage the wellbore or casing wall 30. As will be appreciated by one of skill in the art, this technique can be used to take advantage of the pressure drops across devices to the distal portion of the tubular string, such as pressure drops across bit nozzles, the pressure drop across mud motors rotating the bit, or other devices requiring pressure drop across them. The pressure drop can be engineered and controlled by the operator by the size of the nozzles in the bit, and the flowrate and pressure supplied by the pumps at the surface.

Further, the fluid passageway 64 to the body aperture 66 can be configured to control or limit the flow of fluid. For example, a valve can be positioned in the fluid passageway 64 to control the flow of fluid into the body aperture 66. In this manner, the tractor 4 can be configured such that a pressure drop results in fluid within the body bore 62 having a pressure that is higher than the fluid pressure outside the tractor 4. The pressure differential is predictable and can be controlled by an operator at the surface. For example, in one embodiment a control unit 38 can send a signal to actuate a valve in the fluid passageway 64. The signal can cause the valve to open such that fluid applies a force to wheel mount 68 to move the wheel mount outwardly. Alternatively, the signal can close the valve such that fluid is prevent from entering the fluid passageway 64. When the valve closes, the wheel mount can move inwardly to a retracted position. Additionally, the force required to move the wheel mount 68 outwardly can be selected by friction elements, such as seals, associated with the wheel mount 68.

Hydraulic pressure in the tractor 4 can be controlled by dropping a ball 112 in the wellbore. For example, the tractor 4 can be configured to increase hydraulic pressure in response to contact from a ball 112 transported to the tractor by fluid in the wellbore. Additionally, or alternatively, the tractor 4 can decrease hydraulic pressure due to contact from a ball. In one embodiment, the tractor body 6 is configured to begin rotating, or stop rotating, when a ball contacts the tractor. In another embodiment, the wheel mounts 68 can extend outwardly, or retract inwardly, in response to a ball that contacts the tractor.

Referring now to FIG. 13D, in one embodiment, one or more features of the tractor 4 can be actuated by a ball seat 110. The ball seat 110 is configured to capture an object, such as a ball 112, transported by the flow 114 of fluid within the wellbore to the tractor. In one embodiment, the ball seat 110 is configured to capture balls of different diameters.

The ball seat 110 generally includes an aperture or passageway for fluid that can be selectively blocked by a ball 112. Optionally, the ball seat 110 can have a truncated conical shape. Other geometries of the ball seat 110 are contemplated. The ball seat 110 can be configured to change capture balls of a variety of shapes and diameters.

In one embodiment, when a ball 112 is seated in the ball seat 110, hydraulic pressure in the wellbore will increase. The amount of the increase in the hydraulic pressure can be related to the diameter of the ball seated in the ball seat 110. For example, the ball seat can be configured to block a large percentage of the fluid flow 114 when a large ball 1212A is seated in the ball seat. In this manner, the hydraulic pressure can increase by a large percentage. In contrast, the ball seat can be configured to partially block fluid with a small ball 112B seated in the ball seat such that hydraulic pressure can increase by a small percentage.

Optionally, in another embodiment, the ball seat 110 can be configured to alter the flow of fluid proximate to the tractor 4. More specifically, the ball seat 110 can divert fluid from a first path to a second path when a ball is positioned in the ball seat. In this manner, when a ball is captured in the ball seat, one feature of the tractor 4 can be deactivated and a second feature of the tractor 4 can be activated.

In one embodiment, the tractor body 6 can include a ball seat 110. Optionally, the tractor body can include one or more of an upper ball seat 110A associated with an uphole portion of the tractor body and a lower ball seat 110B associated with a downhole portion of the tractor body. The ball seats 110A, 110B can have different geometries. Additionally, or alternatively, the ball seats 110A, 110B may activate or deactivate different features of the tractor by seating a ball 112.

In one embodiment, the lower ball seat 110B is configured to capture balls with a smaller diameter than the upper ball seat 110A. For example, the upper ball seat 110A can be configured to allow a small ball 112B that is less than a predetermined diameter to pass. However, the lower ball seat 110B can capture the small ball 112B. In one embodiment, the lower ball seat 110B is configured to at least partially block the flow of fluid 114 in the wellbore when a small ball 112B is seated. In this manner, hydraulic pressure upstream of the lower ball seat 110B will increase. In one embodiment, the wheel mounts 68 of the tractor 4 will extend outwardly and contact an interior surface of the wellbore or casing 30 when the lower ball seat 110B captures a ball 112B.

The upper ball seat 110A can be configured to capture a large ball 112A. When a large ball is captured by the upper ball seat 110A, the flow of fluid through the body bore 62 can be at least partially blocked. In response, hydraulic pressure downstream of the upper ball seat 110A will decrease. The wheel mounts 68 can be configured to retract when the upper ball seat 110A captures a ball 112A. In one embodiment, the upper ball seat 110A is configured to substantially prevent the flow of fluid to the body bore 62.

Figure 13E:
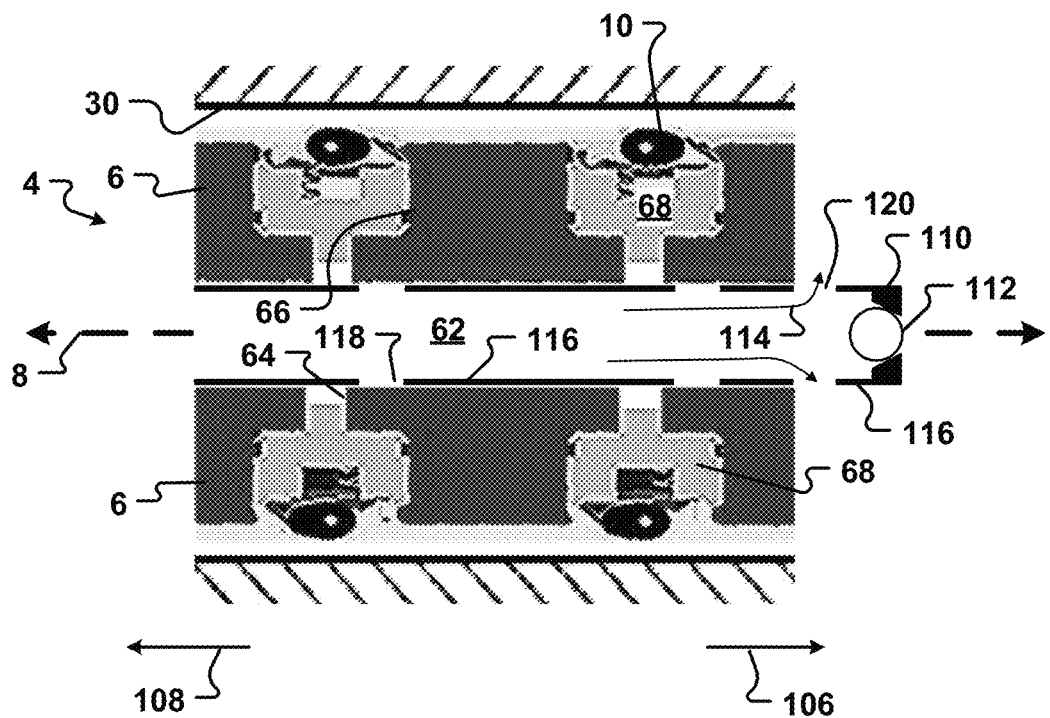
FIG. 13E is a partial cross-sectional side elevation view illustrating a sleeve of the downhole tractor of FIG. 13A in a second position to block the flow of fluid to wheel mounts.

Referring now to FIG. 13E, the tractor 4 can optionally include a sleeve 116 that can be actuated by a ball 112 transported by the flow 114 of fluid in the wellbore. The sleeve 116 is configured to alter the flow of the fluid through the tractor body 6. The sleeve 116 can be generally cylindrical. In one embodiment, the sleeve 116 is configured to fit at least partially within a bore 62 through the tractor body. The sleeve 116 can include a plurality of perforations 118 adapted to selectively align with fluid passageways 64 associated with wheel mounts 68. The sleeve 116 is generally illustrated in FIG. 13E in a position such that the perforations 118 are not in alignment with the fluid passageways 64.

The sleeve 116 can be moveable relative to the tractor 4. Movement of the sleeve 116 can shift the flow of fluid through the body bore 62 to alter operation of the tractor. In one embodiment, when the sleeve is in a first position, the fluid can flow through the perforations 118 into the fluid passageways 64. In this manner, with the sleeve 116 in the first position the wheel mounts 68 can extend outwardly away from the longitudinal axis 8.

Alternatively, when the sleeve 116 is in a second position, the perforations 118 can move out of alignment with the fluid passageways 64 such that the sleeve 116 blocks the flow of fluid into the passageways. Accordingly, when the sleeve 116 is in the second position, the wheel mounts 68 can retract inwardly as generally illustrated in FIG. 13E. In one embodiment, the sleeve 116 can include at least one aperture 120 configured to release fluid 114 from within the sleeve when the sleeve is in the second position.

Optionally, the sleeve can be biased in one of the first position and the second position. In one embodiment, the sleeve can move to the second position when a ball 112 contacts the sleeve 116 such as illustrated in FIG. 13E. Optionally, the sleeve can include a ball seat 110.

Referring now to FIGS. 14A-14F, still another embodiment of a tractor 4 of the present disclosure is generally illustrated. The tractor 4 can include any of the elements described in conjunction with FIGS. 1-13. More specifically, the tractor 4 is similar to the tractor described in conjunction with FIGS. 13A-13E and generally includes a body 6 with a bore 62 for fluid to flow therethrough. A plurality of apertures 66 are formed in the body 6. The apertures 66 can have a generally cylindrical shape. In one embodiment, the apertures 66 are oriented approximately perpendicular to a longitudinal axis 8 of the body 6. The apertures 66 communicate with the body bore 62, for example as generally illustrated in FIG. 14A, to transmit fluid and a force to wheel mounts 68 retained in the apertures 66.

The wheel mounts 68 can be of another embodiment of the disclosure as generally illustrated in FIGS. 14C-14F. The wheel mounts 68 are similar to the wheel mounts described in conjunction with FIG. 13. Each wheel mount 68 has a body 70. In one embodiment, the body 70 is generally cylindrical. Optionally, a seal 76 can be retained to the body.

Notably, the wheel mounts include a biasing element 80 configured to bias the wheel mounts 68 inwardly to a retracted position. The biasing element 80 can be positioned between a mount bracket 69 and the mount body 70. In one embodiment, a portion of the biasing element 80 is interconnected to the tractor body 6. More specifically, the mount bracket 69 can be affixed to the tractor body 6 by fasteners 82 (such as generally illustrated in FIG. 12B). The mount bracket 69 can include a retainer 73 adapted to receive an end of the biasing element 80. A second send of the biasing element 80 can be positioned within a biasing mount 71 of the mount body 70. The biasing mount 71 can be recessed at least partially into the wheel mount body.

The biasing element 80 can optionally be a spring. Regardless, the biasing element 80 can supply a radially compressive force on the wheel mount to move the wheel mount back to an original, retracted position when fluid within the body bore 62 is below a predetermined pressure. In this manner, the biasing element can pull the wheel mount 68 radially to the interior of the body 6 to disengage the wheels 10 of the tractor 4 from the surface of the wellbore or casing.

Additionally, or alternatively, the use of threshold pressure (and rate) of fluid flowing through the tractor body 6 into a body aperture 66 could be enhanced with a dashpot interconnected to a wheel mount 68. As will be appreciated by one of skill in the art, a dashpot is a mechanical device or a damper which resists motion via viscous friction. The resulting force is proportional to the velocity, but acts in the opposite direction, slowing the motion and absorbing energy. Dashpots are commonly used in conjunction with spring which act to resist displacement. A dashpot connected to the wheel mount 68 and the body could be used to regulate motion of the wheel mount 68 relative to the body. For example, the dashpot could be configured to decrease the motion of the wheel mount 68 inwardly or outwardly.

The retracted or withdrawn position of the wheel mount 68 is beneficial for moving the tractor 4 to a desired positioned within the wellbore, such as when the tractor is conveyed into or out of the well by the tubular string to which it is attached, be it casing, coiled tubing, a drillstring, tubing, or other conveyance method. Alternatively, one or more of the wheel mounts 68 described in conjunction with FIGS. 13C and 17B can be used with the tractor 4.

Each wheel mount 68 can be rotatably retained in the body aperture 66. In this manner, the wheel mount 68 can be rotated around the mount axis 74 to alter the angle of the wheel axis 14 relative to the longitudinal axis 8. This is beneficial when the tractor 4 encounters an obstacle. More specifically, the wheel mounts 68 can be rotated to alter the angle of wheels 10 relative to the longitudinal axis 8 to increase or decrease the forward speed of the tractor. In one embodiment, by orienting the wheel axes 14 approximately parallel to the longitudinal axis 8 of the tractor, the forward motion of the tractor can be decreased. In another embodiment, rotating the wheel mounts 68 such that the wheel axes 14 are oriented at an angle of between approximately 30° and approximately 60° with respect to the longitudinal axis 8 will increase the speed of the tractor 4.

In one embodiment, the tractor 4 includes a cam rotation system (not illustrated) configured to rotate the wheel mounts 68 as desired. In another embodiment, the tractor 4 can include servo units, actuators, gears, chains, or pistons configured to rotate the wheel mounts 68 around the mount axis 74.

In one embodiment the wheel mount 68 can be interconnected to the tractor body 6 by a fastener 82, such as a bolt or a screw. The fastener 82 can optionally be received in a bore 62 of the tractor body 6.

Referring now to FIGS. 15A-15E, another tractor 4 of the present disclosure is generally illustrated. The tractor 4 is configured to be interconnected to an electric motor or a mud motor 50 that can selectively transmit torque to rotate the tractor body 6. In one embodiment, the tractor 4 is adapted to be coupled to a reverse Moineau motor 50 as described herein. The tractor body 6 can also be connected to a tubular string that can be rotated to rotate the tractor body 6.

The tractor body 6 can have any predetermined diameter. More specifically, the tractor body 6 can have a diameter that is less than a section of casing or a wellbore in which the tractor will be deployed. In one embodiment, the diameter of the tractor body 6 is between about 2 inches and about 11 inches, or about 4.50 inches. In one embodiment, the tractor body 6 has a first exterior diameter when the wheels 10 are retracted and a second exterior diameter when the wheels are extended. In one embodiment, the second exterior diameter is between two times and four times greater than the first exterior diameter. Optionally, the ratio between the second exterior diameter and the first exterior diameter is at least 2:1 or 3:1.

The first exterior diameter can be between approximately 2.2 inches and approximately 3.7 inches. In one embodiment, the second exterior diameter is between approximately 4.4 inches and approximately 10.5 inches.

A plurality of apertures 66 are formed in the body to receive wheel mounts 68. Optionally, a radial section of the body can have four apertures 66 each offset by approximately 90°. Alternatively, a first radial section of the body can have two apertures 66 offset by approximately 180° and a second radial section can have two apertures offset radially from the apertures of the first radial section such as generally illustrated in FIG. 13B. In one embodiment, the apertures 66 are generally cylindrical. The apertures 66 can have any predetermined diameter. In one embodiment, the diameter of the apertures 66 is between approximately 1.75 inches and 2.50 inches.

The tractor 4 can include a plurality of bores 62 through the body 6. The bores 62 can be oriented generally parallel to a longitudinal axis 8. Optionally, one or more of the bores 62 are adapted to transmit drilling fluid through the body 6. In one embodiment, at least one of the bores 62 is configured to transmit fluid to one or more of the apertures 66 for the wheel mounts 68. Additionally, or alternatively, one or more of the bores 62 can be used for passage of a shaft 52 from a mud motor 50 or for control lines or for an electric wireline.

In one embodiment, a first bore 62A is concentrically aligned with the longitudinal axis 8. Optionally, the first bore 62A has a diameter greater than the shaft 52 of a mud motor 50 illustrated in FIG. 12A. In this manner, the tractor body 6 can rotate relative to the non-rotating shaft 52.

The tractor body 6 can also include at least one outer bore 62B that is spaced from the first bore 62A. The outer bore 62B can be associated with one or more of the wheel mount apertures 66. In one embodiment, the first bore 62A has a diameter that is greater than a diameter of the outer bore 62B. The first bore 62A can have a diameter of between about 0.75 inches and 1.25 inches. Optionally, the outer bore 62B has a diameter of between about 0.50 inches and about 1.0 inches.

Referring now to FIGS. 16-17, an electric tractor 4 of an embodiment of the present disclosure is generally illustrated. The electric tractor 4 includes elements that are the same as or similar to other embodiments of tractors described herein. More specifically, the electric tractor 4 is similar to the tractors described in conjunction with FIGS. 1-15 and can include any of the same or similar components. The electric tractor 4 generally includes a first body 6A and a second body 6B. A housing 92 for an electric motor 94 can be positioned between the first and second bodies 6A, 6B.

The electric motor 94 is configured to selectively apply a torque to rotate one or more of the first and second bodies 6A, 6B. The electric motor 94 can be powered by electricity received from the surface, for example by a wireline 40 interconnected to the tractor 4. Additionally, or alternatively, the electric motor 94 can receive power from a battery 96 associated with the tractor, such as within one or more of the first and second bodies 6A, 6B and/or the electric motor housing 92. In another embodiment, the tractor can include a generator to extract energy from fluid flowing through the wellbore and convert the energy into electricity. Electricity from the generator can then power the electric motor 94 and/or charge the battery 96.

The electric motor 94 can be controlled by a control unit 38 associated with the tractor, such as positioned within the electric motor housing 92. Additionally, or alternatively, the electric motor 94 and other components of the electric tractor 4 can be operated and controlled by a control unit 38 positioned at the surface and connected to the electric tractor by a wireline 40, as generally illustrated in FIGS. 18 and 20. The electric tractor can also be controlled by a control unit 38 at the surface using wireless telemetry such as disclosed in U.S. Pat. No. 9,759,062 and PCT Pub. WO 2014/100262 which are each incorporated herein by reference in their entireties. In this manner, the electric tractor 4 can be controlled without a wired connection to the surface.

The electric motor 94 can be coupled to one or more gearboxes 98 or another torque transfer device. In one embodiment, a first gearbox 98A can selectively transfer torque to rotate the first body 6A in a first direction or a second direction that is opposite to the first direction. A second gearbox 98B can selectively transfer torque to rotate the second body 6B in the first or second directions. Optionally, the second gearbox 98B can apply a second torque to the second body 6B that is opposite to a first torque applied by the first gearbox 98A to the first body A. In one embodiment, the electric tractor 4 includes a first electric motor 94A associated with the first gearbox 98A to drive the first body 6A. A second electric motor 94B can be associated with the second gearbox 98B to drive the second body 6B.

Additionally, or alternatively, the electric motor 94 can selectively apply torque to one or more of the first and second bodies 6A, 6B through the associated first and second gearboxes 98A, 98B. The gearboxes 98 can optionally include a clutch.

A plurality of wheels 10 are interconnected to the bodies 6A, 6B. In one embodiment, the wheels 10 are affixed to wheel mounts 68 such as described in conjunction with FIG. 13C, 14C, or 17B. More specifically, the bodies 6A, 6B can include apertures 66 to receive wheel mounts 10. The wheel mounts 68 can selectively be extended from the bodies 6A, 6B to force wheels 10 into contact with a wellbore or casing surface. In this manner, the wheels 10 can drive the tractor along the wellbore or casing as the bodies 6A, 6B rotate around the longitudinal axis 8. When force and motion of the tractor 4 are not required, the wheel mounts 68 can retract at least partially into the bodies 6A, 6B to separate the wheels from the wellbore or casing surface.

In one embodiment, the wheel mounts 68 can be hydraulically engaged or retracted from the casing wall in the same or similar manner to the tractors 4 described in conjunction with FIGS. 12-16. More specifically, the electric tractor 4 can include a bore 62 as generally illustrated in FIG. 17A. Fluid within the wellbore can flow through the bore 62 and can apply a force to the wheel mounts 68 such that the wheel mounts move outwardly away from the first and second bodies 6A, 6B. As described herein, the hydraulic force in the wellbore can be controlled by an operator at the surface, or by using a hydraulic pump integral to or associated with the tractor assembly. When the fluid pressure within the bore 62 exceeds a predetermined amount, the wheel mounts 68 can extend outwardly such that the wheels 10 contact the interior surface of the wellbore or casing. Additionally, or alternatively, the wheel mounts 68 can include actuators (not illustrated) operable to extend or retract from the bodies 6A, 6B in response to a signal received from a control unit 38 associated with the electric tractor or positioned at the surface.

Optionally, the wheel mounts 68 can also be selectively rotated around a mount axis 74 (which is generally illustrated in FIG. 17B) such that the angle of the wheel axis 14 can be adjusted with respect to the longitudinal axis 8. In this manner, the rate of movement of the tractor 4, and the longitudinal force generated by the tractor 4, can be selectively adjusted. Rotation actuators can be associated with the wheel mounts 68. The rotation actuators (not illustrated for clarity) can engage the wheel mounts and selectively rotate the wheel mounts in response to a signal received from a control unit 38 associated with the electric tractor or located at the surface.

Optionally, the wheel mounts 68 can include a projection or a lip 86 positioned on one or more sides of the wheel axis 14. The lip 86 can be in addition to, or in place of, the wheel recess 78 described in conjunction with FIG. 13C. The lip 86 is configured to protect a wheel 10 affixed to the wheel mount 68. More specifically, the lip 86 is configured to guide or deflect debris and/or fluid away from the wheel 10 while enabling the wheel to operate as needed. In this manner, the lip 86 can decrease, or prevent, jams and slowdowns in the downhole environment.

The wheel mount 68 can also include a suspension system 88. The suspension system 88 can include a biasing element 80. In one embodiment, the biasing element comprises flexible spacers 90 configured to act as a spring. The biasing element 80 supports the wheel mount. Additionally, or alternatively, the biasing element can provide a radial force that the wheel 10 applies to the interior surface of the wellbore or well casing. The radial force supplied by the biasing element 80 on the casing can be increased by adding spacers to increase initial spring distance. Alternatively, spacers 90 of a different stiffness can be installed in the wheel mounts 68. For example, stiffer spacers 90 that will act as a less elastic spring with less deflection can be selectively installed in the wheel mounts.

In one embodiment, the electric motor 94 is positioned between the first and second bodies 6A, 6B. Additionally, or alternatively, the tractor 4 can employ a unique drive design enabled by dual and opposite rotation of the wheels 10. More specifically, the wheel mounts 68A and wheels 10A of the first body 6A can be oriented at an angle 18A that is opposite to an angle 18B of the wheel mounts 68B and wheels 10B of the second body 6B. For example, as generally illustrated in FIG. 17A, the wheel mounts 68A of the first body 6A are oriented such that the wheel axes 14A of the wheels 10A are at an angle 18A of approximately −45° relative to the longitudinal axis 8 while the wheel mounts 68B of the second body 6B are oriented such that the wheel axes 14B of the wheels 10B are at an angle 18B of approximately +45° relative to the longitudinal axis. In this configuration, the first body 6A can rotate around the longitudinal axis 8 in a direction opposite to the second body 6B. More specifically, the first body will rotate clockwise and the second body will rotate counterclockwise around the longitudinal axis 8 as viewed in FIG. 17A. In one embodiment, the first gearbox 98A can apply a first torque to rotate the first body 6A clockwise and the second gearbox 98B can apply a second torque to rotate the second body 6B counterclockwise.

Although the first and second bodies 6A, 6B can rotate in opposite directions, the first and second bodies can push or pull the tractor in the same direction down 106 or up 108 the wellbore. Additionally, if the wheel mounts 68A, 68B are oriented at approximately the same angle, the first and second bodies 6A, 6B can rotate at approximately the same speed. In this manner, the electric motor 94 and other components within the housing 92 of the electric motor can remain upright, moving only horizontally with minimal rotation. This design prevents the need for an idler wheel to hold the tractor 4 in place in a well while drilling, and enables more efficient power usage.

The electric tractor 4 can optionally include a breaking or locking mechanism 100. The locking mechanism 100 can be actuated to engage the wellbore or casing to prevent movement and/or rotation of the tractor 4. Any suitable locking mechanism known to those of skill in the art can be used with the electric tractor 4 of the present disclosure. In one embodiment, the locking mechanism 100 is the same as, or similar to, the clutch 20 described in conjunction with FIGS. 3-5. Additionally, or alternatively, the locking mechanism 100 can include contact strips configured to extend outwardly away from the longitudinal axis 8 to engage the wellbore or casing interior surface. The strips can optionally be formed of a metal. Alternatively, the strips of the locking mechanism 100 can be comprised of a plastic or another suitable material. The strips can be oriented approximately parallel to the longitudinal axis or, alternatively, transverse to the longitudinal axis 8. In one embodiment, the strips are similar to drag springs on packers, or for greater torque resistance, a more conventional slip system can be integrated into the strips.

When the locking mechanism 100 is actuated, the strips can be forced outwardly to engage the wellbore or casing. Optionally, the locking mechanism 100 can be actuated by a signal from the control unit 38. Additionally, or alternatively, the locking mechanism can be actuated by rotation of a lead screw 102 extending from a distal end of the electric tractor 4. Shortening the lead screw will compress the strips and force them into compression with the wall of the wellbore or the casing.

The electric tractor 4 can also include a tool 26, such as a drill bit, a mill, or a reaming tool. Although the tool 26 is generally illustrated positioned at the distal or downhole end 106 of the electric tractor, a tool can also be positioned at the proximal or uphole end 108 of the electric tractor 4. In one embodiment, the tool 26 can rotate in conjunction with the second body 6B. Additionally, or alternatively, the electric tractor 4 can include a third electric motor 94C configured to drive the tool 26. Optionally, a third gearbox 98C can be coupled to the tool 26 and the third electric motor.

The electric tractor 4 can operate in a plurality of modes. In one embodiment, in a first mode, the electric motor 94 and gearbox 98 can power the electric tractor 4 using the wheels 10 to move the electric tractor forward through a subterranean bore, such as a well casing, or an uncased wellbore.

When the electric tractor 4 encounters an obstacle, such as composite frac plug 32, the electric tractor 4 can switch to operate in a second mode. In the second mode, the electric motor 94 can stop supplying torque to rotate the first and second bodies 6A, 6B and their associated wheels 10A, 10B. Optionally, the locking mechanism 100 can grippingly engage the bore or well casing, preventing relative rotation or axial movement of the electric tractor 4 to the wellbore or casing.

When the locking mechanism is firmly in place, the electric tractor 4 can operate in a third mode, or drilling mode. More specifically, in the third mode, the tool 26, comprising a drill bit, a mill or the like, can be actuated and begin to rotate. In one embodiment, as the tool 26 rotates it can begin to extend outwards from the electric tractor 4, pushed by the lead screw 102, drilling into the plug for several inches. When the drill bit 26 has reached its maximum extension, it can retract. In this manner, the lead screw 102 can extend from the distal end of the electric tractor.

In one embodiment, the lead screw is interconnected to the third electric motor 94C. For example, the lead screw 102 can be aligned with a drive shaft of the tool 26. In one embodiment, the lead screw 102 from the third motor 94C can push the tool 26 forward. When a maximum extension of the lead screw 102 and the tool 26 have been reached, the lead screw and tool can retract. When the lead screw 102 extends to the maximum extension, the locking mechanism 100 can return to a disengaged or retracted state and will cease gripping engagement of the casing or wellbore. The electric tractor 4 can then return to the first mode. The electric motor 94 can then apply torque to one or more of the first and second bodies 6A, 6B and the wheels 10 can once again move the tractor forwards or downhole. If the obstruction has not been removed, the lead screw 102 and the tool 26 can retract again and the electric tractor 4 can return to the second mode and the third mode. The extension and retraction of the lead screw and tool can be repeated until the frac plug or another bore obstacle has been removed.

In this manner, in response to encountering an obstacle in the wellbore, the electric tractor 4 can intermittently move forward, slow or stop moving forward, and activate the tool 26 to clear the obstacle. When the obstacle is partially cleared, the electric tractor can move forward again and then activate the tool to continue clearing the obstacle. The process can be repeated until the wellbore is clear. When the obstacle as been cleared, the electric tractor can continue movement down the wellbore.

Optionally, the electric tractor 4 can include a pump 104 to circulate fluid past the tractor and to clean the cuttings from the bit 26. Suitable pumps are known to those of skill in the art. One pump that can be used with the electric tractor is a circulation system used for ice coring and disclosed in Fleckenstein, W. W., & Eustes, A. W. (Jan. 1, 2003), "Novel Wireline Coring System", Society of Petroleum Engineers. doi:10.2118/84358-MS, available at https://www.onepetro.org/conference-paper/SPE-84358-MS and which is incorporated herein by reference in its entirety.

Figure 19:
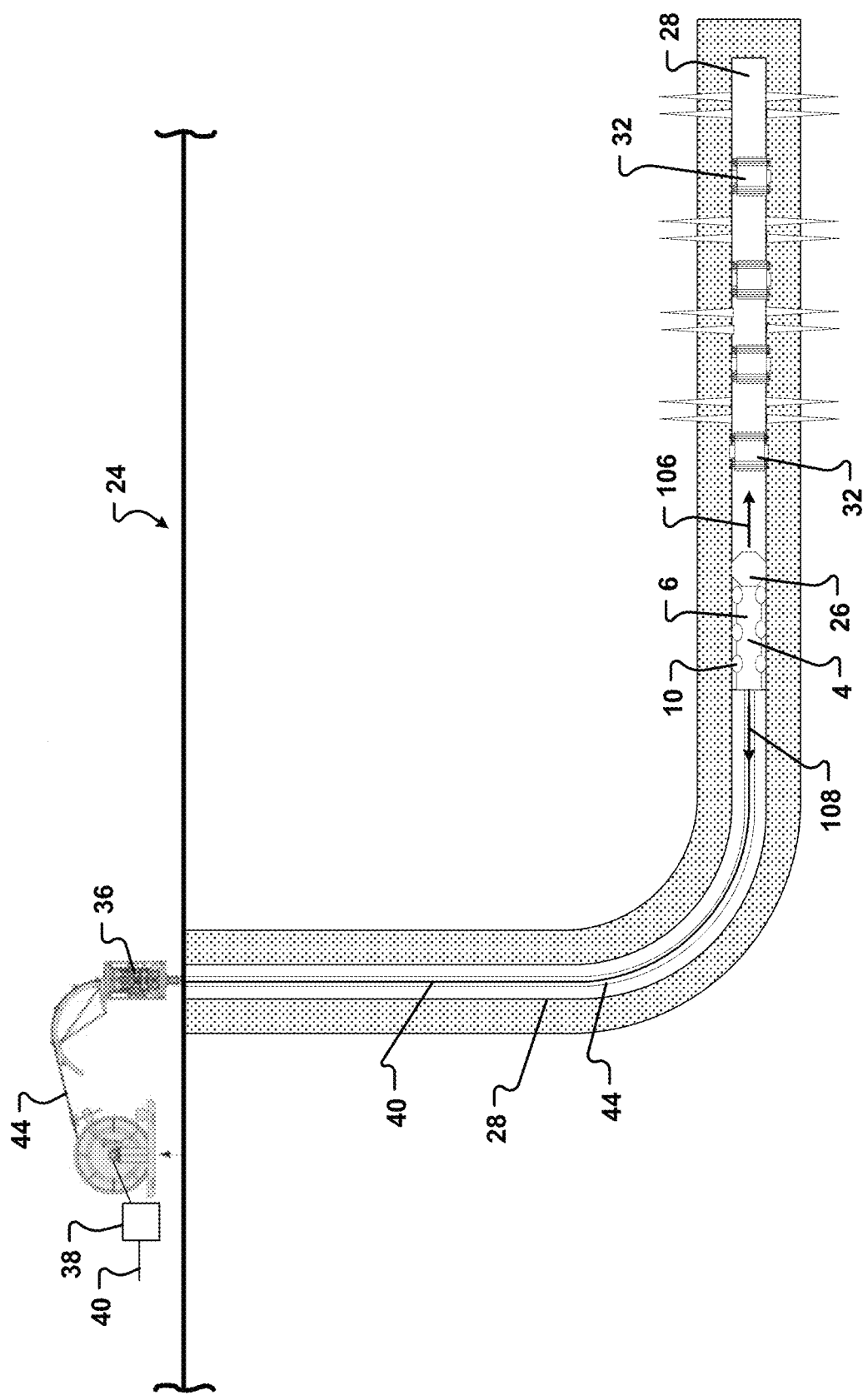
FIG. 19 is another schematic view of a downhole tractor interconnected to a coiled tubing unit and a wireline control system according to another embodiment of the present disclosure.

In one embodiment, the electric tractor 4 operates using power available from the surface. The power can be provided by an electric wireline such as illustrated in FIGS. 18-20. Any known electric wireline 40 can be used to provide power to the downhole tractor.

The electrically actuated tractor can include an electric motor powered by the electric wireline. The electric motor is configured to rotate the tractor body 6. In one embodiment, the electric motor includes a shaft that is interconnected to the tractor.

In one embodiment, the electric tractor 4 does not require hydraulic energy. Accordingly, in operation, no fluid must be pumped from the surface past the tractor to operate the tractor. Accordingly, less equipment may be required to operate an electrically actuated tractor 4 of the present disclosure than prior art tractors. Further, in one embodiment, the electric tractor is entirely self-contained. The only external energy and force can be provided by the electric wireline 40 to operate various components of the tractor 4. The electric wireline may also provide tensile force to pull the tractor and associated equipment out of the wellbore.

Tractors of all embodiments, whether hydraulically actuated or electrically actuated, can engage the wellbore in a similar manner to directly convert rotation of the tractor body 6 into linear force and motion. The wheels 10 may be interconnected to the tractor in a generally spiraled pattern. The spiraled pattern of the wheels facilitates the passage of fluid with cuttings or debris past the tractor. In addition, rotation of the tractor body 6 can actively move debris and material away from the tractor 4. This can prevent or reduce the likelihood of the debris blocking or interfering with operation of the tractor 4. The debris can move away from the tool as fluid is pumped through the wellbore.

The tractors 4 of all embodiments can have a cutting tool 26 affixed to at least the distal end of the tractor. Optionally, a cutting tool 26 can be affixed to a proximal end of the tractor. The cutting tool can be used for drilling, reaming or cleaning operations as desired in a wellbore. Both the hydraulic tractor and the electrically actuated tractor include a tractor body 6 that can rotate. For some applications, a cutting surface, such as that of an oil field mill, can be interconnected to one or more of the distal end and the proximal end of the tractor 4 to allow the tractor to drill up objects and obstructions directly. In this manner, the use of a mud motor or drilling turbine may not be needed in contrast to those typically in used with coiled tubing or jointed work strings. Alternatively, a mill or cutting device could be interconnected to the tractor and used to expand the wellbore diameter or remove obstacles within the wellbore.

A tractor system 24 of the present disclosure can include, but is not limited to, one or more of: (1) a tractor 4; (2) a tool 26 interconnected to the tractor; (3) a circulation pump which can be located at the surface; (4) an electric motor; (5) a clutching mechanism 20; (6) a hydraulic pump and distributed hydraulic lines interconnected to wheels 10 of the tractor; (7) a control system 38 and instruments; and (8) an antitorque section. In one embodiment, the tool 26 comprises a cutting surface or a bit. The control system 38 is operable to send signals to the tractor 4 to control the wheels 10 and other features of the tractor 4 and the tool 26.

Referring now to FIGS. 18-20, embodiments of a tractor system 24 of the present disclosure are generally illustrated. Operation of the tractor 4 within the wellbore 28 can be supported by a heavy duty, oilfield wireline truck 42, with a mast truck to hold a lubricator above the wellhead. There may be a typical 2-3 person wireline crew with an operator to run the tractor 4.

In operation, wireline 40 can be lowered into the wellbore 28 in the conventional manner. The wireline truck 42 can advance the wireline and tractor 4 into the wellbore until gravity is no longer effective to lower the tractor 4 further into the wellbore. At this point, the linear movement of the tractor 4 would begin by rotating the tractor body.

In one embodiment, the tractor system 24 can use an electric motor 94 controlled by signals from the control unit 38 to rotate the tractor body 6. A hydraulic motor or piston would provide distributed hydraulic power to deploy the wheels 10 of the tractor with the desired normal force to provide traction. The tractor 4 would advance down 106 to a distal portion of the wellbore 28 until a first frac plug 32 was encountered. In one embodiment, contact of the tractor 4 with the frac plug 32 can cause the clutch system 20 to engage. Solenoid actuators or a similar electromagnetic device could also be used by the control system 38 to deploy the wheels 10. At that point, a tool 26 interconnected to the tractor 4, such as a drill, would be prepared for drilling operation by beginning circulation of a pump by an operator. The tractor 4 would then begin drilling the plug 32 with the wheels 10 deployed to provide both rotation and compression force to drill the plug up. Alternatively, hydraulic pressure could be provided to rotate or provide energy to the tool 26. In another embodiment, the drill 26 includes jets that rotate the drill as fluid is pumped therethrough. In one embodiment, the drill 26 can rotate independent of the tractor body 6. Optionally, the drill 26 can rotate at a different rate, such as faster or slower, than the rate of rotation of the tractor body 6.

In one embodiment, the tractor 4 includes a hydraulic or an electromagnetic system to provide more control and options for the control of the tractor 4. The hydraulic or electromagnetic systems allow the various components of the tractor to be controlled electronically from the surface. The downhole hydraulic pump or electromagnetic actuator simplify actuation and control of the engagement of the tractor 4 with wellbore walls and obstructions in the wellbores like plugs.

In one embodiment, the clutching system 20 can be actuated by a signal from the control unit 38 at any point in the wellbore 28. Accordingly, milling and other operations which require rotation of the tractor 4 can be selectively performed at a predetermined location or activated by an obstruction in the wellbore to mechanically induce the clutching system 20 illustrated in FIGS. 3-4.

In one embodiment, a load cell or cells may be used to measure the tension provided by the tractor 4 on the wireline 40. Additionally, the compression providing weight on bit to the cutting surface of the tool 26 during milling or drilling operations may also be measured. Torque and pressure could also be measured and, using the electric wireline 40, conveyed to the operator at the surface.

Cuttings from the bit are conveyed past the length of the tractor 4 by the circulation of fluid by the pump through the tool to the cutting surface. The fluid can then take the cuttings along the tool until the cuttings are past a hooded inlet of the pump. The pump inlet can be fitted with a filter system. Optionally, the filters can have a cleaning system to remove any cuttings plugging the inlet. The cuttings would then be left behind the tractor 4. As plugs or other obstructions are drilled up in the wellbore, the cuttings may form a pile, until flow is initiated from the frac stages opened by the drilling of the plug isolating that frac stage. Plugs can continue to be drilled up, using flowback fluid to provide velocity to remove the cuttings.

An anti-torque system, similar to that used in the wireline coring and ice coring drilling systems known to those of skill in the art, can be associated with the tractor. The anti-torque system is configured to provide the reactive torque to allow the drilling of the plug to occur without undue twist of the wireline 40 above the tractor 4. In one embodiment, the anti-torque system is used for tractors 4 that do not include bodies 6A, 6B which rotate in opposite directions as described above in conjunctions with FIGS. 16-17.

The tractor system 24 is operable to engage the motor to rotate a cutting surface at the top of the tractor to allow the tractor 4 to be pulled in an uphole direction 108 from the wellbore so that it can backstream through any debris left in the wellbore. The tractor 4 of all embodiments of the present disclosure can also be used for simple conveyances of tools and logs into the wellbore 28 or a cased hole.

In one embodiment, the tractor 4 can move in the uphole direction 108 using the force generated by movement of the tractor wheels 10. For example, the wheels 10 can be oriented such that the wheel axis 14 causes the force vector 16 (illustrated in FIG. 11A) to be oriented in the uphole direction 108. Additionally, or alternatively, the tractor body 6 can be rotated in a second direction to move the tractor 4 in the uphole direction 108. In one embodiment, a fluid motor 50 or an electric motor 94 can rotate the tractor body 6 in the second direction. Optionally, a gearbox 98 connected to the fluid motor 50 or the electric motor 94 can be actuated to reverse the rotation of the tractor body 6 from a first direction to a second opposite direction.

One advantage that the electric tractor 4 of embodiments of the present disclosure has over prior art tractors is the speed and power possible with the direct application of rotation to the wheels to provide both linear motion and force to overcome obstacles by rotating a cutting surface on the rotating outer cylinder of the tool. Only a single wireline truck would be needed to support the drilling electric tractor 4 of embodiments of the present disclosure. This is a large reduction in surface equipment and provides a great improvement over the expensive plug removal systems currently used which require a tubing connection the surface, high pressure pumps and a circulation system with supporting equipment at the surface to control pressure and drill.

The downhole tractor 4 of all embodiments can be used to remove debris, transport and retrieve downhole tools from the well bore 28, to pull coil tubing 44 within the well bore, and for well logging. Optionally, one or more tools 26 can be interconnected to the body 6. The tools can include, but are not limited to, logging tools (such as tools for formation evaluation, analyzing casing, analysis behind casing, and reservoir pressure measurement) and well intervention tools (including sampling services, perforating, fracturing, milling, and production services). The tools can be used to collect data such as pressure, temperature, pH, particle concentration, viscosity, compression, tension, density, photographic, depth or location information, and other downhole data. Data collected by the tools may be stored onboard the tool 26 or the tractor 4, transmitted to the surface by a wireline 40, such as an electric or fiber-optic connection, or transmitted to the surface by wireless telemetry.

To provide additional background, context, and to further satisfy the written description requirements of 35 U.S.C. § 112, the following references are each incorporated by reference in their entirety: U.S. Pat. Nos. 2,085,115; 3,753,628; 3,876,255; 3,932,072; 4,192,380; 4,614,232; 4,718,824; 4,797,075; 5,135,059; 5,391,059; 5,392,862; 5,649,603; 6,019,583; 6,273,189; 6,460,616; 6,629,571; 6,761,233; 7,159,668; 7,849,927; 8,167,059; 8,177,001; 8,770,303; 8,807,245; 9,045,942; 9,759,062; 9,133,673; 9,500,058; 9,759,062; 10,119,333; U.S. Patent Pub. 2003/0070841; U.S. Patent Pub. 2008/0073077; U.S. Patent Pub. 2009/0236101; U.S. Patent Pub. 2012/0168176; U.S. Patent Pub. 2013/0319769; U.S. Patent Pub. 2013/0081807; U.S. Patent Pub. 2016/0177637; Canadian Patent App. Pub. CA2775524A1; European Patent EP 0564500B1; U.K Patent App. Pub. GB2520752A; PCT Pub. WO 1998/06927; PCT Pub. WO1992010677; PCT Pub. WO 1995/021987; PCT Pub. WO 2000/057100; PCT Pub. WO 2000/73619; PCT Pub. WO 2001/18351; PCT Pub. WO 2003/078887; PCT Pub. WO2013/156781; PCT Pub. WO2014/100262; PCT Pub. WO2017/029606; PCT Pub. WO2017/029621; Billingham et. al, "Conveyance—Down and Out in the Oil Field," Oilfield Review, Summer 2011: 23, no. 2 (2011); Fleckenstein et. al, "Novel Wireline Coring System," SPE 84358 (2003, January 1) (10.2118/84358-MS), available at https://www.onepetro.org/conference-paper/SPE-84358-MS, Schlumberger, "Production Services Tractor System: A versatile Approach to Horizontal Conveyance," December 2003, available at: https://www.slb.com/~/media/Files/production/brochures/wireline_cased_hole/production_logging/maxtrac_pstts.pdf; and Sheiretov, T., "Wireline Tractors and Mechanical Services Tools: Comparative Study of Technical Solutions," (Mar. 22, 2016) SPE-179044-MS, available at https://doi.org/10.2118/179044-MS.

What is claimed is:

1. A downhole tractor for use in a wellbore to advance or retract a tool or a string of pipe in the wellbore, comprising:
   a body having an upper end, a lower end, a body bore extending from the upper end to the lower end such that fluid can flow through the body bore, and a longitudinal axis extending from the lower end to the upper end; and
   a plurality of wheels selectively extendable outwardly from the body to contact the wellbore, the wheels configured to convert rotational movement of the body into linear motion within the wellbore to provide a force in a direction substantially parallel with the wellbore to move the tool or the string of pipe in a predetermined direction, wherein the plurality of wheels are configured to extend outwardly when hydraulic pressure in the body bore exceeds a predetermined amount, and wherein the plurality of wheels are configured to retract inwardly when the hydraulic pressure in the body bore is below the predetermined amount.

2. The downhole tractor of claim 1, wherein the tractor is hydraulically driven.

3. The downhole tractor of claim 1, wherein the tractor is electrically driven.

4. The downhole tractor of claim 1, wherein the tractor is driven by rotation of the string of pipe.

5. The downhole tractor of claim 1, wherein each of the plurality of wheels rotate around a respective rotation axis that is oriented at an angle of between approximately 0° and approximately 90° relative to the longitudinal axis of the tractor body.

6. The downhole tractor of claim 5, wherein the angle between the rotation axis of a wheel and the longitudinal axis can be adjusted by pivoting the wheel to alter at least one of a rate of rotation of the tractor body and a rate of movement of the tractor.

7. The downhole tractor of claim 5, wherein the wheels are Mecanum wheels configured to generate a force vector that is transverse to the rotation axes of the wheels.

8. The downhole tractor of claim 1, wherein each wheel of the plurality of wheels is positioned on a wheel mount that is movably retained within an aperture in the body.

9. The downhole tractor of claim 8, wherein the wheel mount is rotatable around a mount axis to alter an angle between the longitudinal axis and a rotation axis of the wheel.

10. The downhole tractor of claim 1, further comprising a ball seat, wherein when a ball is seated in the ball seat, the plurality of wheels extend outwardly or retract inwardly.

11. A method of advancing or retracting a tool or a string of pipe in a wellbore, comprising:
providing a tractor with a body having an upper end, a lower end, and a plurality of wheels positioned therebetween for operable contact with the wellbore and configured to convert rotation of the tractor body into linear motion of the tractor body and to generate a force in a direction substantially parallel to the wellbore at the location of the tractor;
interconnecting a downhole tool to the tractor;
dropping a ball into the wellbore to change a position of the plurality of wheels relative to the tractor body; and
rotating the tractor body, wherein the tractor and the downhole tool apply a force in the wellbore in a direction substantially parallel with the wellbore.

12. The method of claim 11, wherein rotating the tractor body comprises at least one of pumping a fluid through the wellbore to create hydraulic energy, activating an electric motor, and rotating a pipe which is interconnected to the tractor.

13. The method of claim 11, further comprising selectively pivoting a wheel of the plurality of wheels to alter an angle between a rotation axis of the wheel and a longitudinal axis of the tractor body to adjust at least one of the amount of force generated by the tractor or the direction of the force.

14. The method of claim 13, wherein altering the angle adjusts at least one of a rate of movement of the tractor and a rate of rotation of the tractor body.

15. The method of claim 11, wherein the plurality of wheels are extended and retracted from the tractor body by an increase or a decrease in hydraulic pressure of fluid a bore that extends through the tractor body.

16. The method of claim 11, further comprising increasing hydraulic pressure of fluid in a bore that extends through the tractor body to move the plurality of wheels to an extended position in contact with the wellbore.

17. A downhole tractor for use in a wellbore to advance or retract a tool or a string of pipe in the wellbore, comprising:
a body having an upper end, a lower end, and a longitudinal axis extending from the lower end to the upper end; and
a plurality of wheels selectively extendable outwardly from the body to contact the wellbore, the wheels configured to convert rotational movement of the body into linear motion within the wellbore to provide a force in a direction substantially parallel with the wellbore to move the tool or the string of pipe in a predetermined direction, wherein each wheel of the plurality of wheels is positioned on a wheel mount that is movably retained within an aperture in the body.

18. The downhole tractor of claim 17, wherein the wheel mount is rotatable around a mount axis to alter an angle between the longitudinal axis and a rotation axis of the wheel.

19. The downhole tractor of claim 17, further comprising a body bore that extends from the upper end to the lower end of the tractor body such that fluid can flow through the body bore, wherein the plurality of wheels are configured to extend outwardly when hydraulic pressure in the body bore exceeds a predetermined amount.

20. A downhole tractor for use in a wellbore to advance or retract a tool or a string of pipe in the wellbore, comprising:
a body having an upper end, a lower end, and a longitudinal axis extending from the lower end to the upper end;
a plurality of wheels selectively extendable outwardly from the body to contact the wellbore, the wheels configured to convert rotational movement of the body into linear motion within the wellbore to provide a force in a direction substantially parallel with the wellbore to move the tool or the string of pipe in a predetermined direction; and
a ball seat, wherein when a ball is seated in the ball seat, the plurality of wheels extend outwardly or retract inwardly.

21. The downhole tractor of claim 20, further comprising a body bore that extends from the upper end to the lower end of the tractor body such that fluid can flow through the body bore, wherein the plurality of wheels are configured to extend outwardly when hydraulic pressure in the body bore exceeds a predetermined amount.

22. The downhole tractor of claim 20, wherein each wheel of the plurality of wheels is positioned on a wheel mount that is movably retained within an aperture in the body.

* * * * *